(12) United States Patent
Ahmed et al.

(10) Patent No.: US 10,313,195 B2
(45) Date of Patent: Jun. 4, 2019

(54) DEDICATED PROTECTION FOR VIRTUAL NETWORK EMBEDDING

(71) Applicant: Huawei Technologies Canada Co., Ltd., Ottawa (CA)

(72) Inventors: Reaz Ahmed, Waterloo (CA); Jeebak Mitra, Ottawa (CA); Shihabur Chowdhury, Waterloo (CA); Nashid Shahriar, Waterloo (CA); Raouf Boutaba, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 530 days.

(21) Appl. No.: 15/048,411

(22) Filed: Feb. 19, 2016

(65) Prior Publication Data

US 2017/0078152 A1    Mar. 16, 2017

Related U.S. Application Data

(60) Provisional application No. 62/218,052, filed on Sep. 14, 2015.

(51) Int. Cl.
*H04L 12/24* (2006.01)
*H04L 12/46* (2006.01)

(52) U.S. Cl.
CPC .......... *H04L 41/12* (2013.01); *H04L 12/4641* (2013.01)

(58) Field of Classification Search
CPC ................ H04L 41/12; H04L 12/4641
See application file for complete search history.

(56) References Cited

U.S. PATENT DOCUMENTS

| | | | | |
|---|---|---|---|---|
| 2002/0187770 A1* | 12/2002 | Grover | .................... | H04L 45/00 455/403 |
| 2007/0192863 A1* | 8/2007 | Kapoor | .................... | G06F 9/505 726/23 |
| 2009/0249473 A1* | 10/2009 | Cohn | ................ | H04L 29/12028 726/15 |
| 2012/0051229 A1* | 3/2012 | Feldmann | ............... | H04L 43/04 370/242 |
| 2014/0099119 A1* | 4/2014 | Wei | ..................... | H04J 14/0257 398/79 |
| 2015/0146521 A1* | 5/2015 | Zhu | ..................... | H04L 12/1432 370/229 |

(Continued)

FOREIGN PATENT DOCUMENTS

| | | |
|---|---|---|
| CN | 103532816 | 1/2014 |
| CN | 103746894 | 4/2014 |

(Continued)

OTHER PUBLICATIONS

International Search Report and Written Opinion for International PCT Appl. No. PCT/CN2016/074345 dated Apr. 22, 2016.

(Continued)

*Primary Examiner* — Philip J Chea
*Assistant Examiner* — Robert B McAdams

(57) ABSTRACT

Techniques for virtual network embedding (VNE) with dedicated protection of multiple virtual networks against a single node or link failure are described. The virtual network embedding provides dedicated protection without using redundant substrate network resources for each of the individual virtual networks (VNs) elements.

20 Claims, 15 Drawing Sheets

(56) References Cited

U.S. PATENT DOCUMENTS

2015/0195343 A1* 7/2015 Barabash ............ H04L 67/10
709/204

FOREIGN PATENT DOCUMENTS

| CN | 103812748 | 5/2014 |
|---|---|---|
| KR | 20110088146 | 8/2011 |

OTHER PUBLICATIONS

English translation of abstract of cited reference CN103746894.
English translation of abstract of cited reference CN103532816.
English translation of abstract of cited reference CN103812748.
English translation of abstract of cited reference KR20110088146.
Chowdhury, N.M. Mosharaf Kabir, "A survey of network virtualization," Computer Networks, vol. 54, No. 5, pp. 862-876, 2010.
Rahman, Muntasir Raihan, et al., "Survivable Virtual Network Embedding," IFIP Networking, Springer, vol. 6091, pp. 40-52, 2010.
Ramamurthy, S., et al., "Survivable WDM Mesh Networks, Part I—Protection," INFOCOM '99, Eighteenth Annual Joint Conference of the IEEE Computer and Communications Societies Proceedings, vol. 2, pp. 744-751, 1999.
Ye, Zilong, et al., "Survivable Virtual Infrastructure Mapping with Dedicated Protection in Transport Software-Defined Networks [Invited]," Journal of Optical Communications and Networking, vol. 7, No. 2, pp. A183-A189, 2015.
Gill, Phillipa, et al., "Understanding Network Failures in Data Centers: Measurement, Analysis, and Implications," ACM SIGCOMM Computer Communication Review, vol. 41, No. 4, pp. 350-361, 2011.
Markopoulou, Athina, et al., "Characterization of Failures in an Operational IP Backbone Network," IEEE/ACM Transactions on Networking, vol. 16, No. 4, pp. 749-762, 2008.
Krauthgamer, Robert, et al., "Partitioning Graphs into Balanced Components," Proceedings of the Twentieth Annual ACM-SIAM Symposium on Discrete Algorithms, pp. 942-949, 2009.
Bonsma, Paul, et al., "A Constant-Factor Approximation Algorithm for Unsplittable Flow on Paths," Society for Industrial and Applied Mathematics Journal on Computing, vol. 43, No. 2, pp. 767-799, 2014.
Zhu, Yong, et al., "Algorithms for Assigning Substrate Network Resources to Virtual Network Components," Proceedings IEEE INFOCOM 2006, 25th IEEE International Conference on Computer Communications, pp. 1-12, 2006.
Jiang, Huihui, et al., "Efficient Joint Approaches for Location-Constrained Survivable Virtual Network Embedding," 2014 IEEE Global Communications Conference, pp. 1810-1815, 2014.
Guo, Tao, et al., "Shared Backup Network Provision for Virtual Network Embedding," 2011 IEEE International Conference on Communications (ICC), pp. 1-5, 2011.
Yu, Hongfang, et al., "Survivable Virtual Infrastructure Mapping in a Federated Computing and Networking System under Single Regional Failures," 2010 IEEE Global Telecommunications Conference GLOBECOM, pp. 1-6, 2010.
Yu, Hongfang, et al., "Cost Efficient Design of Survivable Virtual Infrastructure to Recover from Facility Node Failures," 2011 IEEE International Conference on Communications (ICC), pp. 1-6, 2011.
Zhou, Dongyun, et al., "Survivability in Optical Networks," IEEE Network Magazine, pp. 16-23, 2000.
Yu, Hongfang, et al., "Enhancing Virtual Infrastructure to Survive Facility Node Failures", 2011 Optical Fiber Communication Conference and Exposition and the National Fiber Optic Engineers Conference, pp. 1-3, 2011.

* cited by examiner

DEDICATED PROTECTION FOR VIRTUAL NETWORK EMBEDDING

TECHNICAL FIELD

The current disclosure relates to network virtualization, and in particular to embedding virtual networks on physical network resources.

BACKGROUND

Network virtualization allows infrastructure providers, such as data center network operators and internet service providers, to offer virtualized slices of their physical networking infrastructure to other service providers. Virtualization of the network allows multiple virtual networks to be embedded onto a single underlying physical network infrastructure. The embedding of virtual networks onto a physical network can increase the resource management requirements of the physical network components. Typical objectives of virtual network embedding include maximizing the fraction of embedded virtual networks, minimizing the bandwidth provisioning cost on the physical network, etc.

Survivable virtual network embedding attempts to maintain the embedded virtual networks in the event of failures in the underlying physical network infrastructure. Providing survivable virtual network embedding may use a reactive approach that restores embedded virtual networks in response to failures in the underlying physical network infrastructure. Proactive survivable virtual network embedding approaches may proactively provision the virtual network, or portions of the virtual network, onto redundant or backup physical infrastructure. However, such proactive approaches typically rely on over provisioning of the physical network resources, which results in increased capital expenditure.

SUMMARY

In accordance with the present disclosure there is provided a method for embedding a virtual network with dedicated protection onto a physical network comprising a plurality of physical nodes and a plurality of physical links connecting the physical nodes, the method comprising: receiving a virtual network description of a virtual network topology for embedding onto the physical network, the virtual network description comprising: a plurality of virtual nodes; a plurality of virtual links connecting the virtual nodes; and a plurality of location constraints, each location constraint providing an indication of a physical node a virtual node is able to be provisioned on; and embedding the virtual network with dedicated protection onto the physical network by: embedding the virtual network onto a first partition of the physical network according to the location constraints; and embedding a shadow virtual network corresponding to the virtual network onto a second partition, disjoint from the first partition of the physical network according to the location constraints of the virtual network.

In a further embodiment of the method, the physical network is defined according to: $G=(V,E)$, the virtual network is defined according to: $\bar{G}=(\bar{V},\bar{E})$, the shadow virtual network is defined according to: $\tilde{G}=(\tilde{V},\tilde{E})$ where: V is a set of individual physical nodes u; E is a set of individual physical links; $\bar{V}$ is a set of individual virtual nodes $\bar{u}$; $\bar{E}$ is a set of individual virtual links; $\tilde{V}$ is a set of individual shadow virtual nodes $\tilde{u}$ enumerated according to a transformation function $\tau(\bar{u})=\tilde{u}$; and $\tilde{E}$ is a set of individual shadow virtual links corresponding to the set of virtual links $\bar{E}$; the method further comprising: generating a protected virtual network description $\hat{G}=(\hat{V},\hat{E})$, where: $\hat{V}=\bar{V}\cup\tilde{V}, \hat{E}=\bar{E}\cup\tilde{E}$ wherein embedding the virtual network with dedicated protection comprises: embedding $\hat{G}$ on the physical network such that: any virtual node $\bar{u}\in\bar{V}$ and any shadow virtual node $\tilde{u}\in\tilde{V}$ are not provisioned on a same physical node; and any virtual link $(\bar{u},\bar{v})\in\bar{E}$ and any shadow virtual link $(\tilde{u},\tilde{v})\in\tilde{E}$ are not provisioned on a same physical path comprising one or more of the physical links.

In a further embodiment of the method, the plurality of location constraints for a virtual node are provided by a location constraint set associated with the virtual node defined as:

$$l_{\bar{u}u} = \begin{cases} 1 & \text{if } \bar{u} \in \bar{V} \text{ can be provisioned on } u \in V, \\ 0 & \text{otherwise.} \end{cases}$$

In a further embodiment of the method, embedding the virtual network with dedicated protection is determined using an integer linear programming (ILP) formulation.

In a further embodiment of the method, the ILP formulation has an objective function of:

$$\text{minimize} \sum_{\forall (\hat{u},\hat{v}) \in \hat{E}} \sum_{\forall (u,v) \in E} x_{uv}^{\hat{u}\hat{v}} \times C_{uv} \times b_{\hat{u}\hat{v}},$$

where:

$$x_{uv}^{\hat{u}\hat{v}} = \begin{cases} 1 & \text{if } (\hat{u}, \hat{v}) \in \hat{E} \text{ is mapped to } (u, v) \in E, \\ 0 & \text{otherwise.} \end{cases};$$

$C_{uv}$ is a cost of providing unit bandwidth for a physical link between physical nodes u,v; and $b_{\hat{u}\hat{v}}$ is a bandwidth requirement for a virtual link between virtual nodes $\hat{u},\hat{v}$.

In a further embodiment of the method, the embedding is determined using a heuristic approach comprising: a node mapping phase during which virtual nodes of the virtual network and shadow virtual nodes of the shadow virtual network are mapped to physical nodes of the physical network; a physical network partitioning phase during which unmapped physical nodes of the physical network are partitioned to either the first partition or the second partition; and a link mapping phase during which virtual links of the virtual network and shadow virtual links of the shadow virtual network are mapped to physical paths in respective ones of the first partition and second partition.

In a further embodiment of the method, the node mapping phase comprises mapping each node of the virtual network and each node of the shadow virtual network to a separate node of the physical network.

In a further embodiment of the method, the node mapping phase further comprises one or more of: determining whether mapping a virtual node to a physical node makes it impossible to connect remaining virtual nodes; determining whether mapping a virtual node to a physical node reduces a shortest path length of virtual nodes in the first partition or the second partition; and determining whether mapping a virtual node to a physical node increases a connectivity of virtual nodes in the first partition or the second partition.

In a further embodiment of the method, the physical network partitioning phase comprises one or more of: determining whether adding the unmapped physical node to one of the first or second partitions makes virtual nodes of the other partition impossible to be connected; determining whether adding the unmapped physical node to one of the first or second partitions reduces a shortest path length in the first or second partitions; determining whether adding the unmapped physical node to one of the first or second partitions increases a connectivity of virtual nodes in the first partition or the second partition; and determining which one of the first and second partitions is smaller.

In a further embodiment of the method, the link mapping phase comprises mapping virtual links to physical paths within the disjoint partitions.

In accordance with the present disclosure there is further provided a system for embedding a virtual network with dedicated protection onto a physical network comprising a plurality of physical nodes and a plurality of physical links connecting the physical nodes, the system comprising: a processing unit for executing instructions; and a memory unit for storing instructions, which when executed by the processor configure the system to perform steps for: receiving a virtual network description of a virtual network topology for embedding onto the physical network, the virtual network description comprising: a plurality of virtual nodes; a plurality of virtual links connecting the virtual nodes; and a plurality of location constraints, each location constraint providing an indication of a physical node a virtual node is able to be provisioned on; and embedding the virtual network with dedicated protection onto the physical network by: embedding the virtual network onto a first partition of the physical network according to the location constraints; and embedding a shadow virtual network corresponding to the virtual network onto a second partition, disjoint from the first partition of the physical network according to the location constraints of the virtual network.

In a further embodiment of the system, the physical network is defined according to: G=(V,E), the virtual network is defined according to: $\overline{G}=(\overline{V},\overline{E})$, the shadow virtual network is defined according to: $\hat{G}=(\hat{V},\hat{E})$ where: V is a set of individual physical nodes u; E is set of individual physical links; $\overline{V}$ is a set of individual virtual nodes $\overline{u}$; $\overline{E}$ is a set of individual virtual links; $\hat{V}$ is a set of individual shadow virtual nodes $\hat{u}$ enumerated according to a transformation function $\tau(\overline{u})=\hat{u}$; and $\hat{E}$ is a set of individual shadow virtual links corresponding to the set of virtual links $\overline{E}$; wherein the when executed by the processor the instructions further configure the system to perform steps for: generating a protected virtual network description $\tilde{G}=(\tilde{V},\tilde{E})$, where: $\tilde{V}=\overline{V}\cup\hat{V}$, $\tilde{E}=\overline{E}\cup\hat{E}$, wherein embedding the virtual network with dedicated protection comprises: embedding $\tilde{G}$ on the physical network such that: any virtual node $\overline{u}\in\overline{V}$ and any shadow virtual node $\hat{u}\in\hat{V}$ are not provisioned on a same physical node; and any virtual link $(\overline{u},\overline{v})\in\overline{E}$ and any shadow virtual link $(\hat{u},\hat{v})\in\hat{E}$ are not provisioned on a same physical path comprising one or more of the physical links.

In a further embodiment of the system, the plurality of location constraints for a virtual node are provided by a location constraint set associated with the virtual node defined as:

$$l_{\overline{u}u} = \begin{cases} 1 & \text{if } \overline{u} \in \overline{V} \text{ can be provisioned on } u \in V, \\ 0 & \text{otherwise.} \end{cases}$$

In a further embodiment of the system, embedding the virtual network with dedicated protection is determined using an integer linear programming (ILP) formulation.

In a further embodiment of the system, the ILP formulation has an objective function of:

$$\text{minimize}\left(\sum_{\forall(\hat{u},\hat{v})\in\hat{E}} \sum_{\forall(u,v)\in E} x_{uv}^{\hat{u}\hat{v}} \times C_{uv} \times b_{\hat{u}\hat{v}}\right),$$

where:

$$x_{uv}^{\hat{u}\hat{v}} = \begin{cases} 1 & \text{if } (\hat{u},\hat{v}) \in \hat{E} \text{ is mapped to } (u,v) \in E, \\ 0 & \text{otherwise.} \end{cases};$$

$C_{uv}$ is a cost of providing unit bandwidth for a physical link between physical nodes u,v; and $b_{\hat{u}\hat{v}}$ is a bandwidth requirement for a virtual link between virtual nodes $\hat{u},\hat{v}$.

In a further embodiment of the system, the embedding is determined using a heuristic approach comprising: a node mapping phase during which virtual nodes of the virtual network and shadow virtual nodes of the shadow virtual network are mapped to physical nodes of the physical network; a physical network partitioning phase during which unmapped physical nodes of the physical network are partitioned to either the first partition or the second partition; and a link mapping phase during which virtual links of the virtual network and shadow virtual links of the shadow virtual network are mapped to physical paths in respective ones of the first partition and second partition.

In a further embodiment of the system, the node mapping phase comprises mapping each virtual node of the virtual network and each shadow virtual node of the shadow virtual network to a separate physical node of the physical network.

In a further embodiment of the system, the node mapping phase further comprises one or more of: determining whether mapping a virtual node to a physical node makes it impossible to connect remaining virtual nodes; determining whether mapping a virtual node to a physical node reduces a shortest path length of virtual nodes in the first partition or the second partition; and determining whether mapping a virtual node to a physical node increases a connectivity of virtual nodes in the first partition or the second partition.

In a further embodiment of the system, the physical network partitioning phase comprises one or more of: determining whether adding the unmapped physical node to one of the first or second partitions makes virtual nodes of the other partition impossible to be connected; determining whether adding the unmapped physical node to one of the first or second partitions reduces a shortest path length in the first or second partitions; determining whether adding the unmapped physical node to one of the first or second partitions increases a connectivity of virtual nodes in the first partition or the second partition; and determining which one of the first and second partitions is smaller.

In a further embodiment of the system, the link mapping phase comprises mapping virtual links to physical paths within the disjoint partitions.

BRIEF DESCRIPTION OF THE DRAWINGS

Embodiments are described herein with reference to the appended drawings, in which.

DETAILED DESCRIPTION

Network virtualization has evolved as a key enabling technology for offering the next generation of network services. With increasing deployments of virtualized networks in production networks using commodity hardware, virtual network embedding is expected to handle failures in the underlying substrate network. The virtual network embedding described further herein attempts to provide efficient techniques for dedicated protection of multiple virtual networks against a single node or link failure without relying on redundant substrate network resources for each of the individual virtual network elements.

The dedicated protection virtual network embedding described herein is intended to provide dedicated protection for large scale networks while maintaining reasonable virtual link to physical link ratios, which can reduce over-provisioning of the physical network infrastructure. While the virtual network embedding described herein may be well suited for large scale networks, it may also be applicable to virtual network embedding on small networks. The dedicated protection virtual network embedding can determine if it is possible to provision the virtual network with protection on the physical infrastructure. The virtual network embedding solution uses less resources and can find a near optimal solution even for large virtual networks. Further, the dedicated protection for virtual network embedding technique may use a heuristic approach that can determine an embedding solution for large networks in near real time.

In providing the virtual network embedding with dedicated protection, which may be referred to as a protected virtual network embedding, the virtual nodes' primary and backup embedding must both satisfy the location constraints of the virtual nodes. Further, each virtual node is mapped to a single primary physical node as well as a single backup physical node. No physical node is shared between multiple virtual nodes from the same virtual network that has been requested to be embedded on the physical network. Each virtual link should be mapped to a set of physical links that satisfy the virtual link's bandwidth requirement. The objective of the virtual network embedding is to minimize the cost of embedding the virtual links on the physical network.

Figure 1:
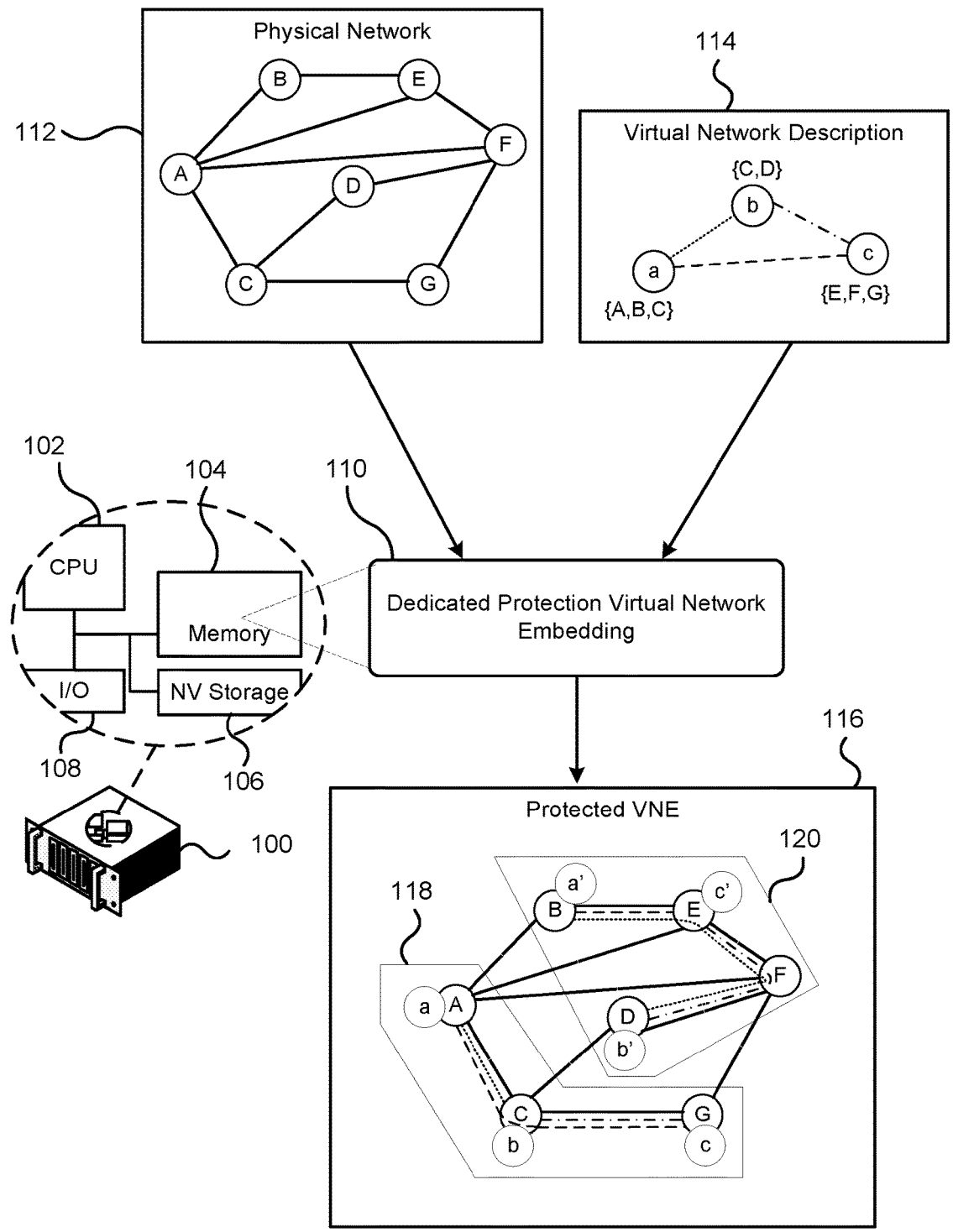
FIG. 1 depicts components of a system for virtual network embedding with dedicated protection.

FIG. 1 depicts components of a system for virtual network embedding with dedicated protection. The system may comprise one or more computing devices, represented as a single server 100. Although depicted as a single server 100, the system may be implemented as one or more real or virtual servers. Regardless of the particular implementation, the server 100 includes a processing unit 102 for executing instructions and a memory 104 for storing instructions, as well as data. The server 100 may further comprise non-volatile storage 106 for providing storage of both instructions and data for long periods of time. Further, the server 100 may include one or more input/output interfaces or devices 108 that allow the server to interact with users and/or other systems. For example, the I/O interfaces or devices 108 may include keyboards, mice, monitors, network interfaces, etc. The instructions stored in the memory 104 may configure the server 100 to provide virtual network embedding functionality 110 with dedicated protection. Broadly, the virtual network embedding functionality 110 receives a virtual network definition 114 and determines a mapping 116 of the protected virtual network to a physical network 112, or substrate network. Once the mapping is determined, the mapping may be embedded on the physical network 112 to implement the virtual network.

As depicted, the physical network 112 comprises a plurality of physical nodes A, B, C, D, E, F, G and a number of physical links, depicted as lines, connecting the nodes A, B, C, D, E, F, G. Each of the physical links has an associated bandwidth capacity, which may differ from link to link. In addition to the bandwidth capacity, each link also has an associated cost for providing a unit of bandwidth.

The virtual network description 114 may describe the topology and constraints of the virtual network to be embedded onto the physical network 112. As depicted, the virtual network description 114 comprises three virtual nodes a, b, c connected by virtual links each having a bandwidth requirement. It is noted that the different virtual links are represented by various line styles in FIG. 1 to more easily identify the virtual links embedded over physical paths. The bandwidth requirements of each of the virtual links are depicted as all being the same. Additionally, the virtual network description includes location constraints for each of the virtual nodes. As depicted, the location constraint set for virtual node a is {A,B,C}, indicating that virtual node a must be provisioned on one of physical nodes A, B or C. Similarly, the virtual node b must be provisioned on physical node C or D, and virtual node c must be provisioned on physical node E, F or G.

The dedicated protection virtual network embedding functionality 110 receives the virtual network description and attempts to embed the requested virtual network and a backup version of the virtual network onto the physical network 112. Assuming the embedding is successful, the resulting embedding provisions the requested virtual network and a backup version of the requested virtual network onto two disjoint partitions 118, 120 of the physical network. As depicted, the requested virtual network is embedded such that virtual node a is provisioned on physical node A, virtual node b is provisioned on physical node C, and virtual node c is provisioned on physical node G. The backup virtual network, a', b', c' is also provisioned onto the same physical network 112. As depicted, the backup virtual network is embedded in a disjoint partition of the physical network 112 from the embedding of the primary virtual network. The backup virtual network is embedded such that virtual node a' is provisioned on physical node B, virtual node b' is provisioned on physical node D, and virtual node c' is provisioned on physical node E.

The dedicated protection virtual network embedding functionality 116 embeds both a primary, or requested, virtual network and a backup virtual network that corresponds to the requested virtual network onto the same physical infrastructure such that both virtual networks are provisioned in disjoint partitions of the physical network while still satisfying the location constraints of the requested virtual network. By embedding the primary and backup virtual networks on disjoint partitions of the physical network, the protected virtual network embedding ensures the virtual network can survive a single node or link failure in the underlying physical infrastructure. The protected virtual network embedding may allow infrastructure providers to offer backup or redundancy to virtual networks without requiring augmenting the physical infrastructure.

Figure 2:
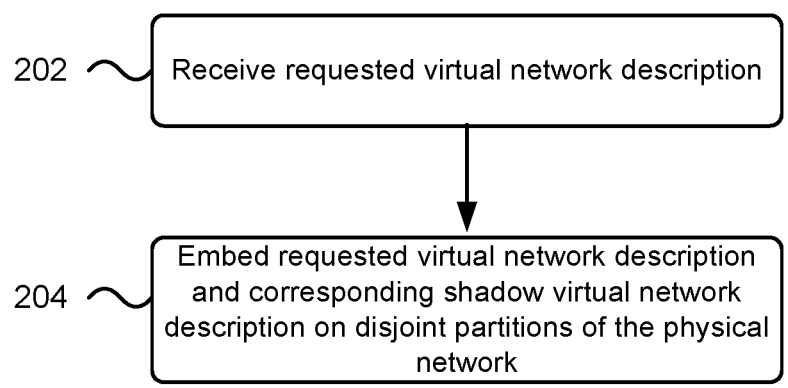
FIG. 2 depicts a method for virtual network embedding with dedicated protection.

FIG. 2 depicts a method 200 for virtual network embedding with dedicated protection. The method 200 may be performed by various computer systems. However, in one illustrative embodiment, the method 200 may be performed by a computer system of an infrastructure provider that is used for configuring the physical infrastructure. The method 200 receives a request describing a virtual network to be implemented on the physical infrastructure in a step 202. The virtual network description may be specified in numerous ways; however, regardless of the particular specification, it describes at least the plurality of virtual nodes along with the virtual links connecting the virtual nodes. Additionally, the virtual network description specifies location constraints for each of the virtual nodes. The location constraints for a particular virtual node specify a plurality of physical nodes that the virtual node can be provisioned on. As a simple example, a virtual network may require that one or more virtual nodes be physically located within a particular geographic region. In such a case, the location constraints allow specifying that the physical nodes are located within the desired geographic region.

The location constraints may be specified in a number of ways. For example, the physical nodes that a virtual node may be provisioned on could be provided as a list. Alternatively, the constraints may specify which physical nodes that virtual node cannot be provisioned on. Further, the location constraint set for a virtual node may be specified as a vector, with each element of the vector corresponding to a physical node and each element's value providing an indication of whether or not the virtual node can be provisioned on the corresponding physical node. Further still, the location constraint set may specify characteristics that a physical node must have, or must not have, in order to provision the virtual node. The location constraint sets for each individual virtual node may be specified separately for each of the virtual nodes, or may be provided as one or more location constraints for a plurality of virtual nodes. For example, a plurality of location constraint sets specified as individual vectors could be combined together into a single matrix specifying the location constraint sets for a plurality of the virtual nodes.

In addition to specifying the virtual nodes, virtual links, and the location constraint sets for the virtual nodes, the virtual network description may also specify bandwidth requirements for one or more of the virtual links.

Once the virtual network definition to be embedded is received, the requested virtual network description as well as a shadow virtual network corresponding to the requested virtual network description are embedded on disjoint partitions of the physical network in a step 204. In addition to embedding each of the requested virtual network description and corresponding shadow virtual network description in disjoint partitions, the virtual network embedding with dedicated protection also ensures that the location constraints, and bandwidth requirements if any, of the virtual network description and corresponding shadow virtual network are satisfied. Determining the embedding of the virtual network with dedicated protection may be done in various ways. For example, the embedding problem may be specified as an Integer Linear Programming (ILP) formulation that may be solved. Solving the ILP formulation will provide the optimal solution; however, the time required to do so for large networks may be undesirably long. Accordingly, a heuristic method of determining the embedding may be used. The heuristic approach may provide a sub-optimal, although acceptable, solution in significantly shorter time for larger networks.

Figure 3:
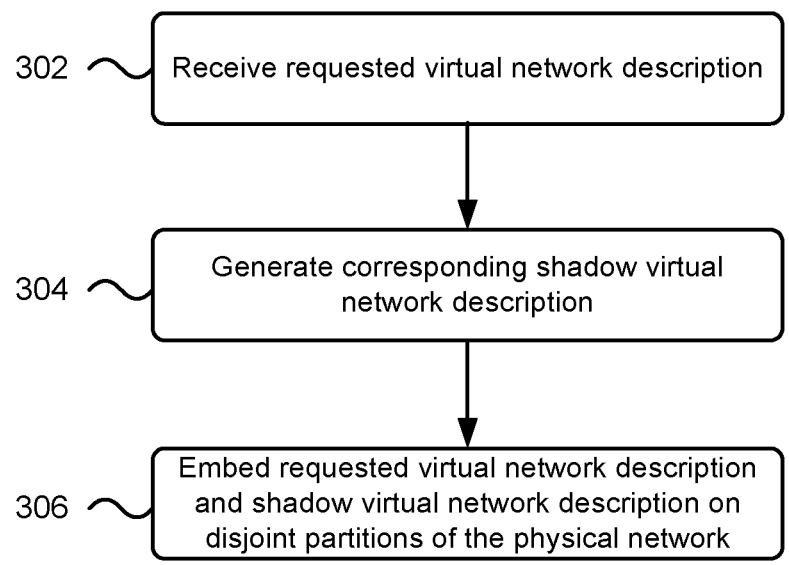
FIG. 3 depicts a further method for virtual network embedding with dedicated protection.

FIG. 3 depicts a further method 300 for virtual network embedding with dedicated protection. The method 300 is similar to the method 200 in that it provides a virtual network embedding with dedicated protection; however, the method 300 generates the shadow virtual network prior to embedding the requested virtual network and shadow network. The method 300 receives a request describing a virtual network to be implemented on the physical infrastructure in a step 302. The virtual network description may be specified in numerous ways; however, regardless of the particular specification, it describes at least the plurality of virtual nodes along with the virtual links connecting the virtual nodes. Additionally, the virtual network description specifies location constraints for each of the virtual nodes. As described above with reference to FIG. 2, the location constraints for a particular virtual node specify a plurality of physical nodes that the virtual node can be provisioned on, and may be specified in a number of ways. In addition to specifying the virtual nodes, virtual links, and the location constraint sets for the virtual nodes, the virtual network description may also specify bandwidth requirements for one or more of the virtual links.

Once the virtual network description is received, the method 300 generates a shadow, or backup, virtual network description in a step 304. The generated shadow virtual network description has the same topology as the received virtual network description. That is, the generated shadow virtual network description has the same number of virtual nodes connected by the same number of virtual links and in the same manner as the received virtual network description. In addition to having the same topology, the shadow virtual network description has the same location constraints on the virtual nodes as the received virtual network description. That is, virtual nodes in the shadow virtual network description have the same location constraint sets as the corresponding virtual nodes of the received virtual network description. Although the location constraint sets correspond for both the received virtual network description and the generated shadow network description, the bandwidth requirements for the virtual links of the generated shadow network description may or may not be the same as the bandwidth requirements of the corresponding virtual links of the received virtual network description. Such flexibility in specifying the bandwidth requirements of the virtual links of the shadow or backup network may be used in offering different service levels. As an example, one offering may provide a backup virtual network that provides the same amount of bandwidth as the primary network, while another offering may provide a backup virtual network that only provides a minimally acceptable amount of bandwidth, such as half, in the case of a primary network failure.

Once the shadow virtual network definition is generated in the step 304, the requested virtual network description and the generated shadow virtual network description are embedded on disjoint partitions of the physical network in a next step 306. In addition to embedding each of the virtual network descriptions in disjoint partitions, the embedding also ensures that the location constraints, and bandwidth requirements if any, of both virtual network descriptions are satisfied. As described above with reference to FIG. 2, determining the embedding of the virtual network with dedicated protection may be done in various ways, such as solving an ILP formulation or using a heuristic approach.

Figure 4:
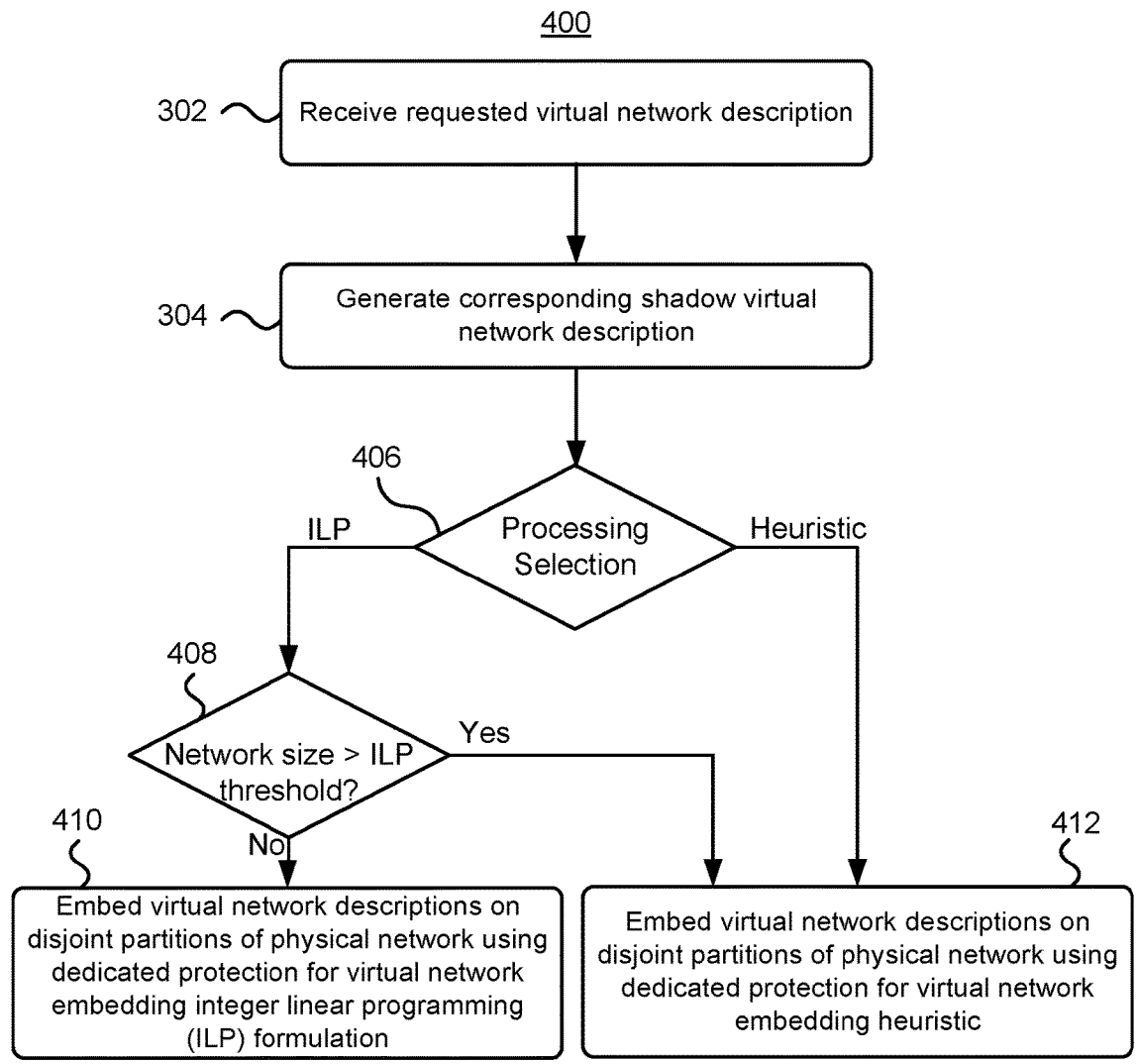
FIG. 4 depicts a further method for virtual network embedding with dedicated protection.

FIG. 4 depicts a further method 400 for virtual network embedding with dedicated protection. The method 400 is similar to the method 300 described above, however, the method 400 may use one of a number of processing techniques described in further detail below for determining the embedded virtual network having dedicated protection. The method 400 receives the requested virtual network description in a step 302 and then generates the corresponding shadow virtual network description in a next step 304, as described above. The method 400 further determines a processing selection step 406 for processing the virtual network embedding. The processing selection may be determined based on a user indication, for example a user may indicate that they wish the embedding to use an integer linear programming (ILP) technique or a heuristic technique. Alternatively, the processing selection could be determined based on other factors, expressed either explicitly or implicitly by a user. For example, a default processing selection may be used unless some indication is received from the user indicating that a processing technique other than the default should be used. As an example, a heuristic processing technique may be a default technique, and so unless a user explicitly indicates that another technique such as ILP should be used, the heuristic processing technique is selected. Additionally, or alternatively, a user may indicate the importance of determining the optimal solution, an amount of time they are willing to wait, or other factors that could help determine a processing technique to select in determining the virtual network embedding. Whether or not a user may wish to use the ILP technique may be based on a number of factors, including a size of the physical network, a size of the requested virtual network, available computing resources, importance of finding an optimal solution, and an acceptable length of time to find a solution. Generally, a small virtual network suitable for embedding using the ILP technique may be a virtual network having less than 15 virtual nodes for embedding onto a physical network of less than 50 physical nodes. If the processing selection is determined to be ILP in the processing selection step 406, the method 400 may determine if the network size is bigger than a threshold size set for ILP processing at a step 408. The ILP processing threshold may provide a size above which it is impractical to determine the solution using ILP due to several reasons including the amount of time required to obtain a feasible solution using an ILP approach. Although it may be impractical from a length of time point of view, it is still possible to determine the solution. If the network size is determined to not be greater than the ILP threshold (No at step 408), the embedding of both the received virtual network description and the generated shadow virtual network description is determined using an ILP formulation in a step 410. If the network size is greater than the ILP threshold (Yes at 408), the virtual network embedding may be processed using a heuristic approach in a step 412. Although depicted as determining the virtual network embedding using the heuristic approach when the network size is greater than the ILP threshold, it is possible to prompt a user that using the ILP technique may require a significant amount of time and determine if they wish to use the ILP or heuristic approach.

In the following, a physical network is represented as an undirected graph $G=(V,E)$ where $V$ and $E$ are the set of physical nodes and links, respectively. Each physical link $l(u,v)$ between two physical nodes $u$ and $v$ has a bandwidth capacity $b_{uv}$ and a cost $c_{uv}$ for allocating unit bandwidth on the physical link when provisioning a virtual link. The set of neighbors of each physical node is represented by $N(u)$. A virtual network is represented by an undirected graph $\overline{G}=(\overline{V}, \overline{E})$, where $\overline{V}$ and $\overline{E}$ are the set of virtual nodes and virtual links respectively. Each virtual link $l(\overline{u},\overline{v})$ between virtual nodes $\overline{u}$ and $\overline{v}$ has a bandwidth requirement $b_{\overline{uv}}$. Each virtual node $u$ has a location constraint set $L(\overline{u})$ of physical nodes such that a virtual node $u$ can only be provisioned on a physical node $u$ belonging to the set $L(\overline{u})$. The shadow virtual network description corresponding to $\overline{G}$ is denoted $\tilde{G}=(\tilde{V},\tilde{E})$, where $\tilde{V}$ is the set of individual shadow virtual nodes $\tilde{v}$ enumerated according to a transformation function $\tau(\overline{u})=\tilde{u}$. An expanded virtual network description is the union of the requested virtual network description and the corresponding shadow virtual network description and is denoted by $\hat{G}=\overline{G}\cup\tilde{G}$.

The ILP formulation provides a number of decision variables, constraints and an objective function. Minimizing the objective function provides the virtual network embedding. The decision variables, constraints and objective function are described below.

Decision Variables

A virtual link is mapped to a non-empty set of physical links creating a physical path. The following decision variable is introduced to indicate the mapping between a virtual link $(\hat{u},\hat{v})\in\hat{E}$ and a physical link $(u,v)\in E$.

$$x_{uv}^{\hat{u}\hat{v}} = \begin{cases} 1 & \text{if } (\hat{u},\hat{v}) \in \hat{E} \text{ is mapped to } (u,v) \in E, \\ 0 & \text{otherwise.} \end{cases} \quad (1)$$

The following decision variable represents the virtual node mapping:

$$y_{\hat{u}u} = \begin{cases} 1 & \text{if } \hat{u} \in \hat{V} \text{ is mapped to } u \in V, \\ 0 & \text{otherwise.} \end{cases} \quad (2)$$

Constraints

Types of constraints include link mapping constraints, node mapping constraints, and mutual exclusion constraints.

Link Mapping Constraints:

$$\forall (\hat{u},\hat{v})\in\hat{E}: \Sigma_{\forall (u,v)\in E} x_{uv}^{\hat{u}\hat{v}} \geq 1 \quad (3)$$

$$\forall (u,v)\in E: \Sigma_{\forall (\hat{u},\hat{v})\in\hat{E}} x_{uv}^{\hat{u}\hat{v}} \times b_{\hat{u}\hat{v}} \leq b_{uv} \quad (4)$$

$$\forall \hat{u},\hat{v}\in\hat{V}, \forall u\in V: \Sigma_{\forall v\in N(u)}(x_{uv}^{\hat{u}\hat{v}}-x_{vu}^{\hat{u}\hat{v}})=y_{\hat{u}u}-y_{\hat{v}u} \quad (5)$$

Every virtual link is mapped to a non-empty set of physical links by equation (3). Equation (3) also ensures that no virtual link is left unmapped. It is also necessary to ensure that the resources of the physical links are not over-committed, which is provided by equation (4). Finally, equation (5) makes sure that the in-flow and out-flow of each physical node is equal except at the nodes where the endpoints of a virtual link are mapped. This flow conservation constraint ensures a continuous path between the mapped endpoints of a virtual link.

The binary nature of the virtual link mapping decision variable and the flow constraint prevent any virtual link being mapped to more than one physical path. Thus, the link mapping may be modeled as a multi-commodity unsplittable flow problem.

Node Mapping Constraints:

$$\forall \hat{u} \in \hat{V}, \\ \forall u \in V: y_{\hat{u}u} \leq l_{\hat{u}u} \quad (6)$$

where:

$$l_{\hat{u}u} = \begin{cases} 1 & \text{if } \hat{u} \in \overline{V} \text{ can be provisioned on } u \in V \\ 0 & \text{otherwise.} \end{cases} \quad (7)$$

$$\forall u \in V: \sum_{\hat{u} \in \hat{V}} y_{\hat{u}u} \leq 1 \quad (8)$$

A virtual node should be mapped to exactly one node in the physical network according to the given location constraints of equation (7), which is ensured by equation (6). Equation (8) ensures that a physical node does not host more than one virtual node from the same virtual network request.

Mutual Exclusion Constraints:

Every virtual link in $\overline{G}$ and its corresponding virtual link in $\tilde{G}$ must be embedded on two node and link disjoint paths in the physical network. To ensure this mutual exclusion property, the virtual links in $\overline{G}$ and $\tilde{G}$ are first constrained to be mapped on mutually exclusive sets of physical edges according to equations (9) and (10).

$$\forall (u,v) \in E: \Sigma_{\forall(\tilde{u},\tilde{v}) \in \tilde{E}} x_{uv}^{\tilde{u}\tilde{v}}, \forall (\overline{u},\overline{v}) \in \overline{E} \quad (9)$$

$$\forall (u,v) \in E: x_{uv}^{\overline{u}\overline{v}} = 0 \text{ if } \Sigma_{\forall(\tilde{u},\tilde{v}) \in \tilde{E}} x_{uv}^{\tilde{u}\tilde{v}} > 0, \forall (\overline{u},\overline{v}) \in \overline{E} \quad (10)$$

Then, the virtual link endpoints of the primary embedding are prevented from being an intermediate node on the path of backup embedding and vice versa according to equations (11) and (12).

$$\forall u \in V: y_{\tilde{u}u} = 0, \text{ if } \Sigma_{\forall(\tilde{u},\tilde{v}) \in \tilde{E}} \Sigma_{\forall v \in N(u)} x_{uv}^{\tilde{u}\tilde{v}} > 0 \quad (11)$$

$$\forall u \in V: \Sigma_{\forall(\tilde{u},\tilde{v}) \in \tilde{E}} \Sigma_{\forall v \in N(u)} x_{uv}^{\tilde{u}\tilde{v}} = 0, \text{ if } y_{\overline{u}u} = 1 \quad (12)$$

It is also ensured that the physical paths corresponding to the virtual links in $\overline{G}$ and $\tilde{G}$ do not share any intermediate nodes according to equations (13) and (14). This constraint is necessary to ensure that a physical failure does not affect a primary resource and its corresponding backup resource at the same time.

$$\forall u \in V: \Sigma_{\forall(\tilde{u},\tilde{v}) \in \tilde{E}} \Sigma_{\forall v \in N(u)} x_{uv}^{\tilde{u}\tilde{v}} = 0, \text{ if } \Sigma_{\forall(\overline{u},\overline{v}) \in \overline{E}} \Sigma_{\forall v \in N(u)} x_{uv}^{\overline{u}\overline{v}} > 0 \quad (13)$$

$$\forall u \in V: \Sigma_{\forall(\overline{u},\overline{v}) \in \overline{E}} \Sigma_{\forall v \in N(u)} x_{uv}^{\overline{u}\overline{v}} = 0, \text{ if } \Sigma_{\forall(\tilde{u},\tilde{v}) \in \tilde{E}} \Sigma_{\forall v \in N(u)} x_{uv}^{\tilde{u}\tilde{v}} > 0 \quad (14)$$

Objective Function

It is desired to minimize the cost of provisioning bandwidth on the physical links. Accordingly, the objective function of equation (15) will provide a solution for the embedding.

$$\text{minimize}(\Sigma_{\forall(\tilde{u},\tilde{v}) \in \hat{E}} \Sigma_{\forall(u,v) \in E} x_{uv}^{\tilde{u}\tilde{v}} \times C_{uv} \times b_{\hat{u}\hat{v}}) \quad (15)$$

Although the above ILP formulation will provide an optimal embedding of the protected virtual network, the computational complexity, and so the time required, may be prohibitive. A heuristic approach may be used to provide an acceptable solution in an acceptable amount of time. For example, the heuristic approach described further below may provide an embedding that has an associated cost that may be 10%-15% higher than the optimal embedding; however the heuristic approach may arrive at the non-optimal solution in near real time. As an example, for large networks of 150 nodes or more, the ILP formulation may take over an hour to compute an optimal embedding, while the heuristic based approach may find an acceptable solution in less than 1 second. The ability to determine near-optimal solutions in near real-time allows for greater flexibility in provisioning networks. For example, virtual networks can be provisioned, tested, changes made to the virtual network, re-provisioned and tested again, all without requiring long wait times to determine possible embeddings for the virtual networks.

Figure 5:
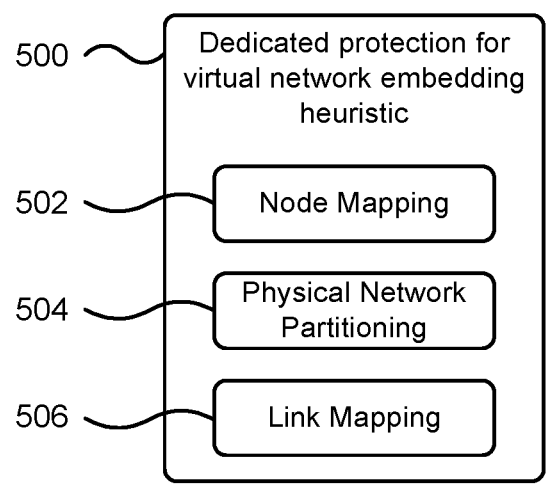
FIG. 5 depicts components of a heuristic method for virtual network embedding with dedicated protection.

FIG. 5 depicts components of a heuristic method 500 for virtual network embedding with dedicated protection. The heuristic method 500 comprises functionality for node mapping 502, functionality for partitioning the physical network 504, and functionality for mapping links 506. The functionality is described in further detail below. The node mapping functionality 502 maps the virtual nodes of both the primary requested virtual network and the shadow virtual network to physical nodes according to the location constraints of the virtual nodes. Once the virtual nodes of the primary and shadow virtual networks are mapped to physical nodes, the remaining unmapped physical nodes are allocated by the network partitioning functionality 504 to one of the two partitions for the primary network or shadow network. Once the physical nodes are partitioned into two disjoint partitions, the links between the nodes can be mapped by the link mapping functionality 506. The node mapping, network partitioning and final link mapping processes are depicted schematically in FIGS. 6, 7, and 8, respectively.

Figure 6:
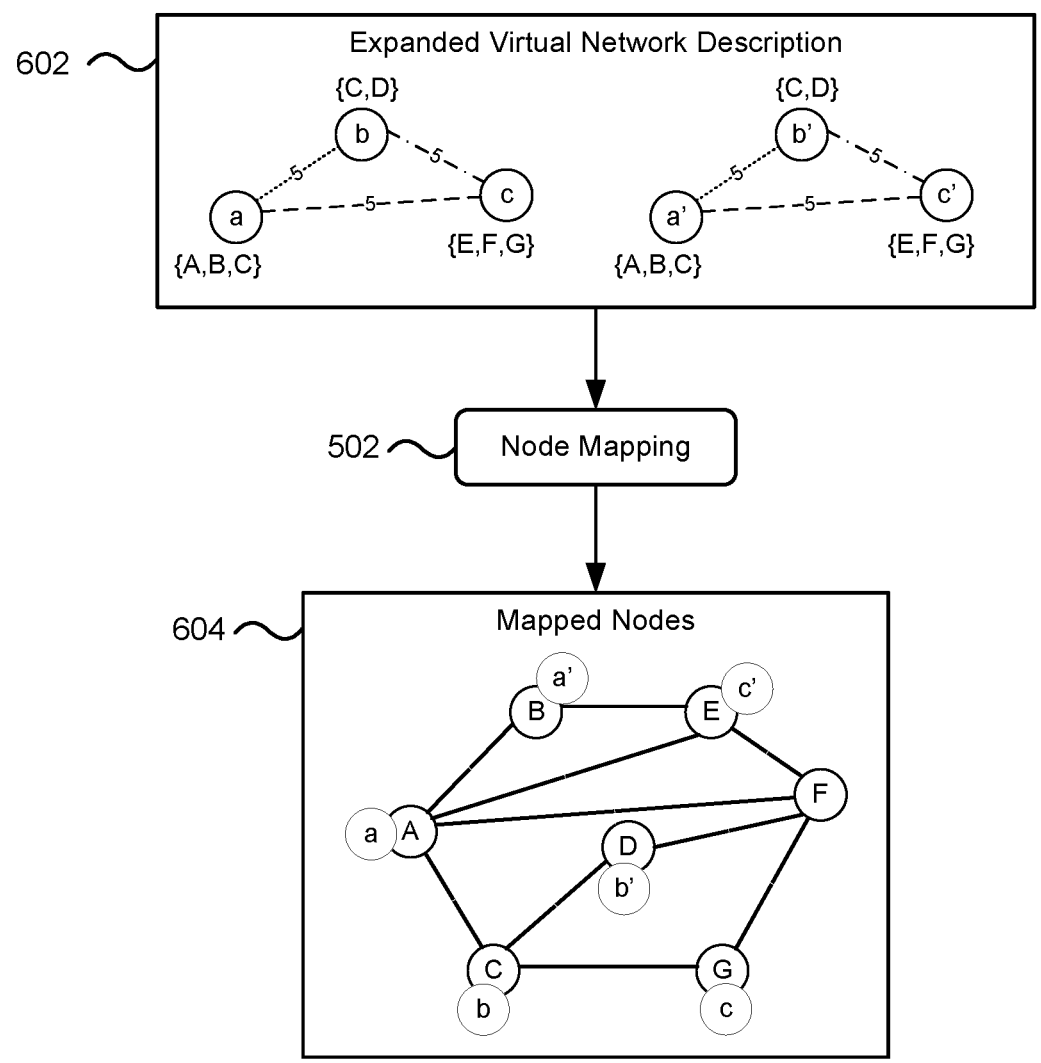
FIG. 6 depicts a process of node mapping.

FIG. 6 depicts a process of node mapping. As depicted, the node mapping functionality 502 receives an expanded virtual network description 602 comprising the requested virtual network description and the shadow virtual network description. It is possible that the node mapping functionality 502 could receive only the requested virtual network description and could generate the shadow virtual network description internally if the shadow virtual network and the requested virtual network have the same requirements. If the shadow virtual network has different requirements, for example providing only a minimum sustainable connectivity in light of multiple link failures in the original virtual network, the node mapping functionality 502 will receive the expanded virtual network description 602 comprising both the virtual network and shadow network descriptions. Regardless, the requested virtual network description comprises a plurality of virtual nodes a, b, c connected by virtual links, each having an associated bandwidth requirement. Each of the virtual nodes a, b, c also has an associated location constraint set. The shadow virtual network description comprises corresponding virtual nodes, a', b', c' and virtual links. Although the bandwidth requirements of the shadow virtual network are depicted as being the same as the requested virtual network, they need not be. For example, the bandwidth requirements of the backup virtual network may be half, or some other fraction, of the corresponding bandwidth requirements of the requested virtual network. Each of the virtual nodes of the shadow virtual network has location constraint sets that are the same as their corresponding virtual nodes in the requested virtual network. As depicted, the node mapping functionality 502 maps each of the virtual nodes to the physical network so that each virtual node is mapped to a physical node in its location constraint set, and each physical node is mapped to only a single virtual node. A resulting mapping of the nodes is denoted at 604.

As depicted in FIG. 6, virtual node a is mapped to physical node A and virtual node a' is mapped to physical node B. It is noted that physical nodes A and B are in the location constraint set of virtual node a, and the corresponding virtual node a' of the shadow virtual network. Similarly, virtual node b is mapped to physical node C. Since virtual nodes b, b' only have two physical nodes in their associated location constraint set, namely nodes C and D, virtual node b' must be mapped to physical node D. Virtual nodes c and c' are mapped to physical nodes G and E respectively. Once all of the virtual nodes from the requested virtual network description and the shadow virtual network description are mapped to physical nodes, the remaining physical nodes may be partitioned.

Figure 7:
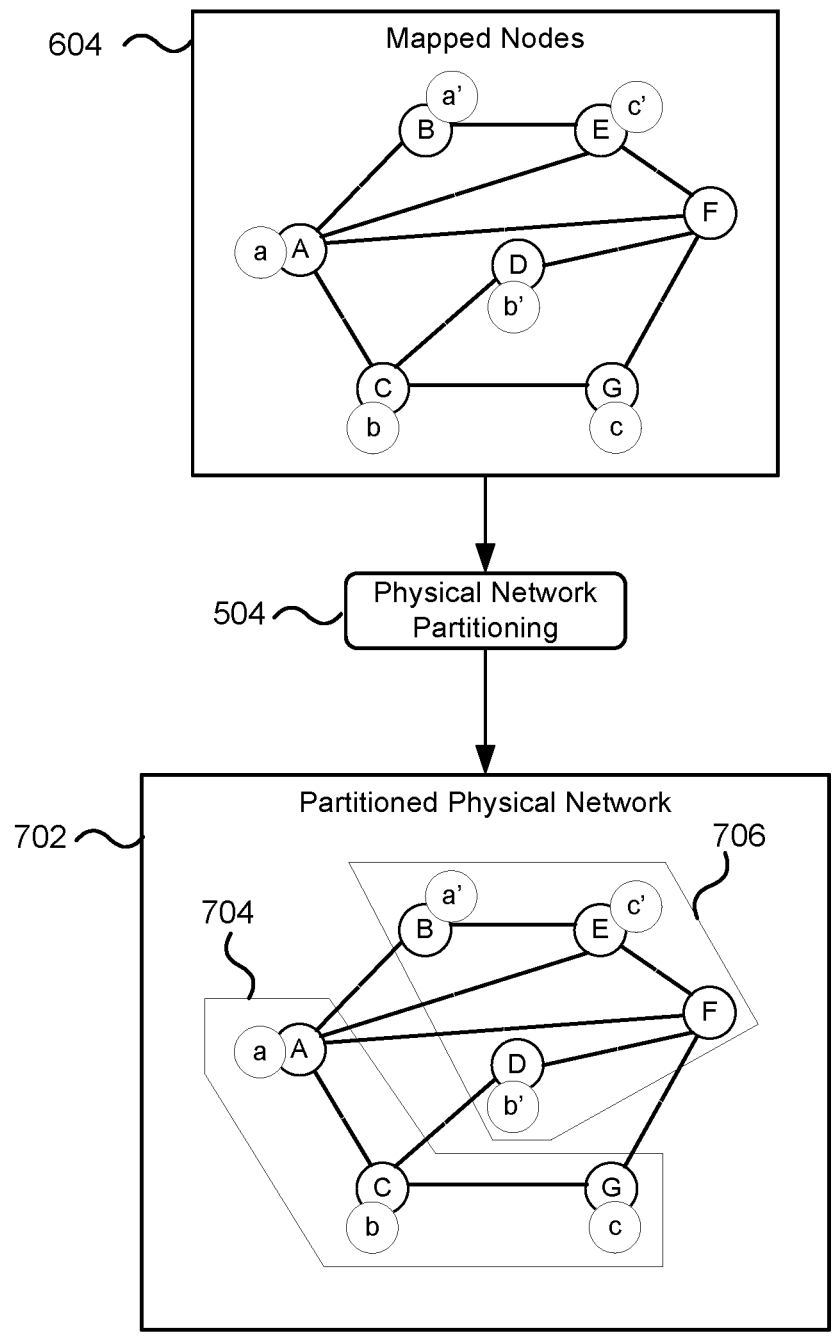
FIG. 7 depicts a process of physical network partitioning.

FIG. 7 depicts a process of physical network partitioning. The physical network partitioning functionality 504 receives an indication of the mapping of the nodes 604. The physical network partitioning functionality 504 partitions the unmapped physical nodes into one of the partitions of either the requested virtual network description or the shadow virtual network description. That is, the partitioning 504 determines for each unmapped physical node whether the physical node should be part of a primary partition 704 or part of a shadow or backup partition 706. As can be seen from FIG. 7, only physical node F needs to be considered since all other physical nodes have been mapped to virtual nodes of either the primary or backup virtual network. The partitioning functionality 504 partitions the physical node F into the shadow or backup partition 706, to permit connecting the shadow virtual network as required. Once the physical nodes are partitioned, resulting in a partitioned physical network 702, the virtual links can be mapped using the physical nodes and links within each respective partition.

Figure 8:
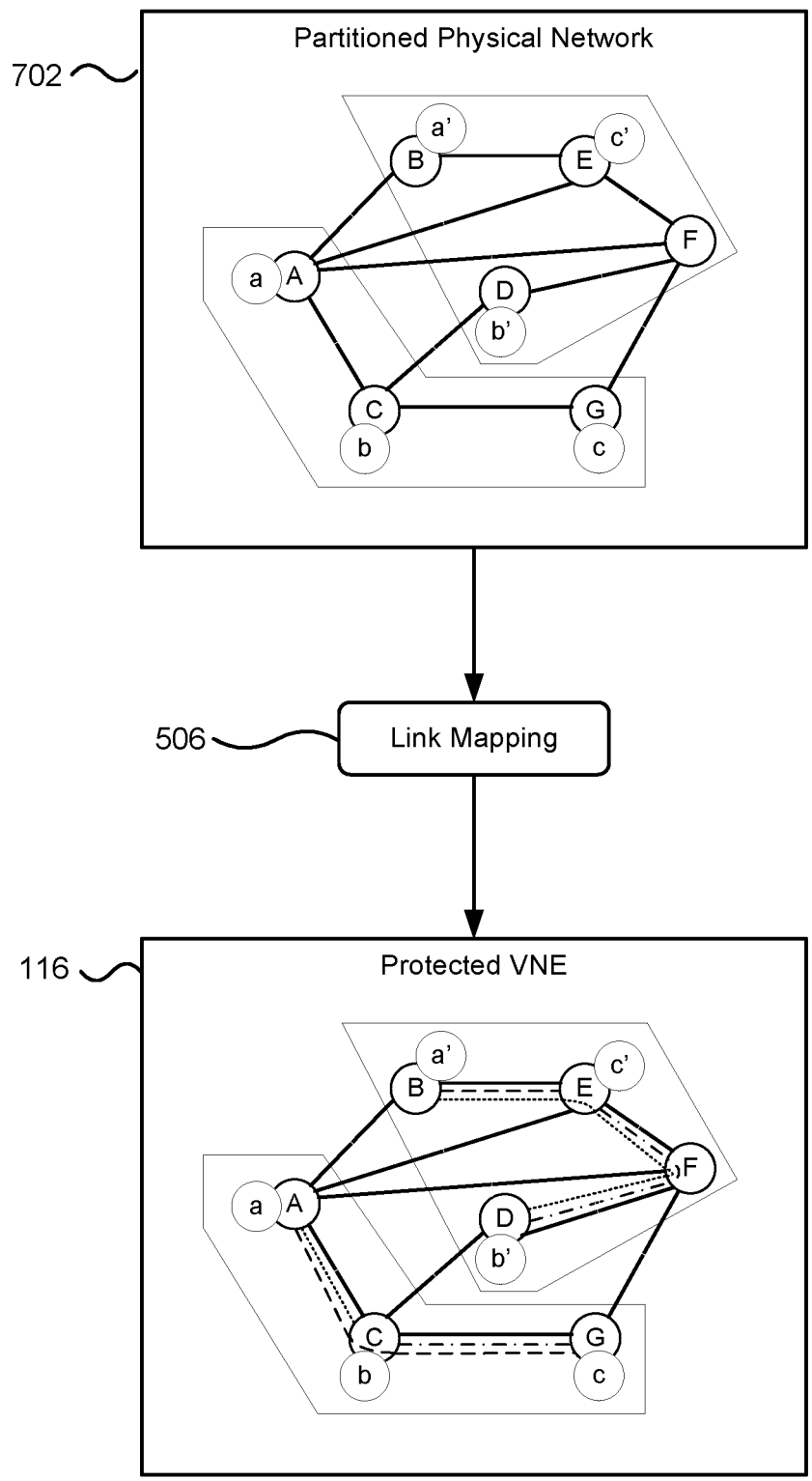
FIG. 8 depicts a process of link mapping.

FIG. 8 depicts a process of link mapping. The link mapping functionality 506 receives information about the mapping of virtual nodes to physical nodes, as well as the partitioned physical network 702, and maps the virtual links to the physical infrastructure to provide a protected virtual network embedding 116. As depicted, the virtual link (a,b) is mapped to physical link (A,C), virtual link (b,c) is mapped to the physical link (C,G), and virtual link (a,c) is mapped to the physical path (A,C,G). Similarly, virtual link (a',b') is mapped to physical path (A,E,F,D), virtual link (b',c') is mapped to the physical path (D,F,E) and virtual link (a',c') is mapped to the physical link (B,E).

As depicted in FIG. 8, the protected virtual network embedding embeds a primary virtual network and a backup virtual network onto the physical infrastructure. Both the primary and backup virtual networks are embedded according to location constraints of the virtual network that was requested.

The heuristic approach to embedding may start with an initial seed for both primary and backup node mappings of a virtual node. Given the initial primary and backup mappings, the heuristic approach attempts to map the virtual nodes to primary and backup physical node embeddings. Once the virtual nodes are mapped to the primary and backup physical nodes, any remaining physical nodes that have not been mapped are partitioned to either the primary or backup partition. Once the physical network is partitioned, the physical nodes and links within each partition may be used to map the virtual links of the primary and backup virtual networks.

The three phase heuristic algorithm may be run for different initial seed node mappings and the solution with the lowest cost may be retained. To generate different seed node mappings, the set of virtual nodes that have the fewest elements in their location constraint set may be identified. These virtual nodes may be referred to as the most constrained virtual nodes, since they have the fewest options for mapping to physical nodes. For each of these most constrained virtual nodes $\overline{u}_c$, every pair of physical nodes from $\overline{u}_c$'s location constraint set may be generated and each pairing used as an initial primary and backup node embedding for $\overline{u}_c$. The resultant embedding for each of the different initial mappings can be determined and the lowest cost embedding selected as the final embedding. Each of the phases of the heuristic approach is described in further detail with reference to FIGS. 9 through 11. It is noted that the following description assumes only a single initial mapping is used and, as such, it is not necessary to compare the costs of different potential solutions.

Figure 9:
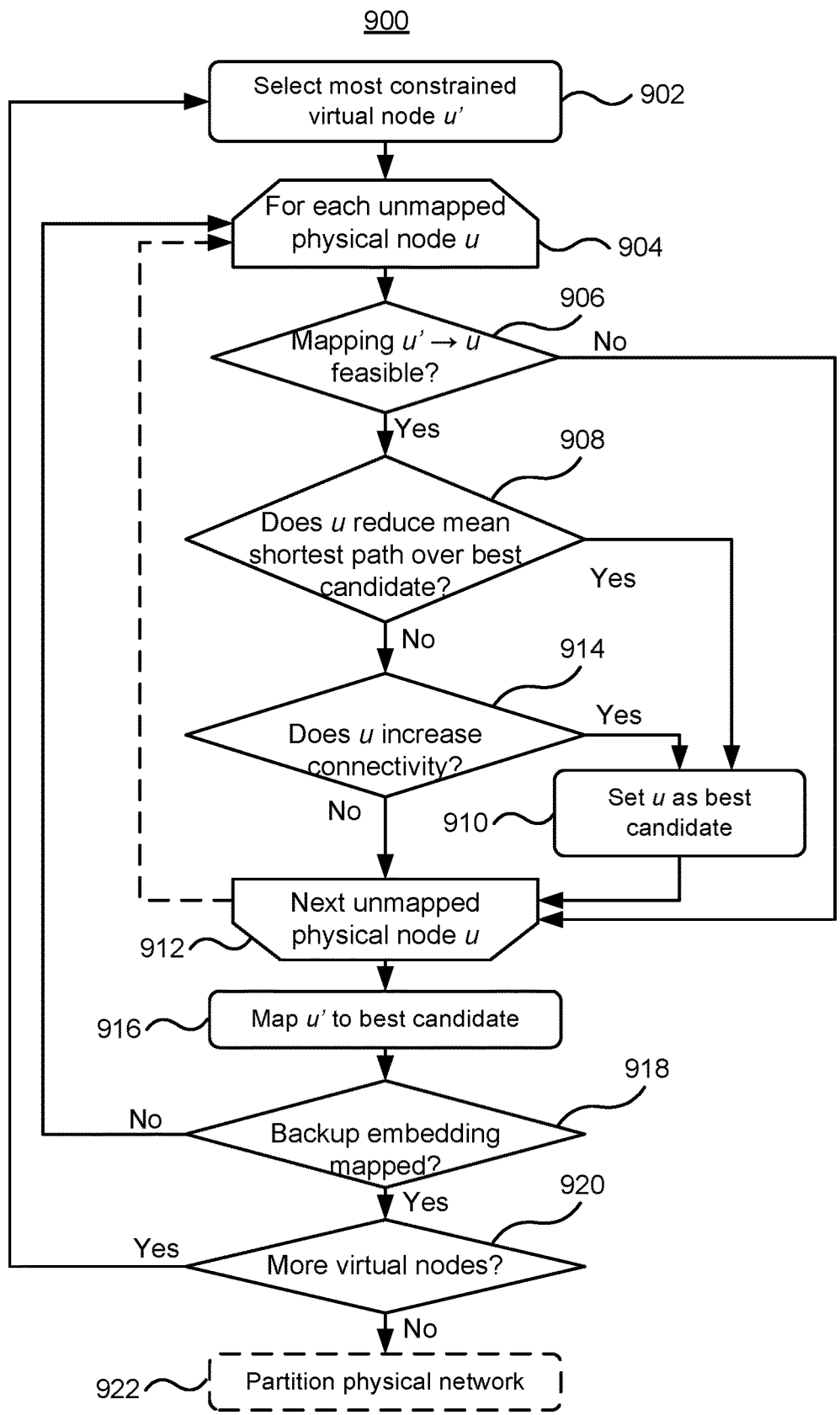
FIG. 9 depicts a method of node mapping.

FIG. 9 depicts a method 900 of node mapping. The method 900 begins with a step 902 of selecting a most constrained virtual node. As described above, the most constrained virtual node may be considered as the virtual node with the fewest physical nodes in its location constraint set. If there are a number of equally constrained potential virtual nodes based on the location constraint sets, the connectivity of the virtual node may be considered, with more connected virtual nodes being considered as more constrained. Each of the virtual nodes is processed to first provide a primary mapping and then to provide a backup mapping for the virtual node. Once the most constrained virtual node is selected, each of the unmapped physical nodes are selected and considered in step 904 as a possible mapping candidate for the virtual node. In a step 906, it is determined whether mapping the virtual node to the currently selected physical node is feasible. A mapping may be considered as feasible if mapping the virtual node to the primary mapping does not make the backup mapping impossible. If the mapping is feasible (Yes at step 906), it is determined in a step 908 whether the mapping would reduce a mean shortest path. If the mapping is not feasible (No at step 906), the next unmapped physical node is selected in a step 912 and processing returns to step 904. If the mapping does reduce the mean shortest path length between the set of mapped nodes in the same mapping, i.e. either the primary mapping or the backup mapping (Yes at step 908), the currently selected physical node is set as the current best candidate at step 910 and the next unmapped physical node is considered in a step 912. If the mapping does not reduce the mean shortest path length, it is determined in a step 914 whether mapping the virtual node to the selected physical node increases connectivity between the set of mapped nodes of the particular mapping being considered, i.e. the primary mapping or the backup mapping. If the mapping does increase the connectivity (Yes at step 914), the best mapping candidate is set in a step 910 to the currently selected physical node, and the next unmapped physical node is selected for consideration. If the mapping does not increase the connectivity (No at step 914), the next unmapped node is considered. Once all of the unmapped physical nodes have been considered, the virtual node is mapped to the best candidate of the physical nodes at a step 916. The above has described determining a single mapping for a virtual node. As described above, each virtual node has a corresponding shadow virtual node which needs to be mapped to a backup physical node. Accordingly, a step 918 determines whether the backup mapping of the virtual node, or the mapping of the shadow virtual node, has been completed. If the backup mapping has not been completed (No at step 918), the process is repeated to find a second mapping for the virtual node. If the backup mapping has been completed for the virtual node (Yes at step 918), it is determined whether there are more virtual nodes to be mapped at a step 920 and if there are (Yes at step 920), the next most constrained virtual node is selected at step 902. If there are no more virtual nodes (No at step 920), the primary and backup mappings are complete and the remaining physical network is partitioned at a step 922.

Figure 10:
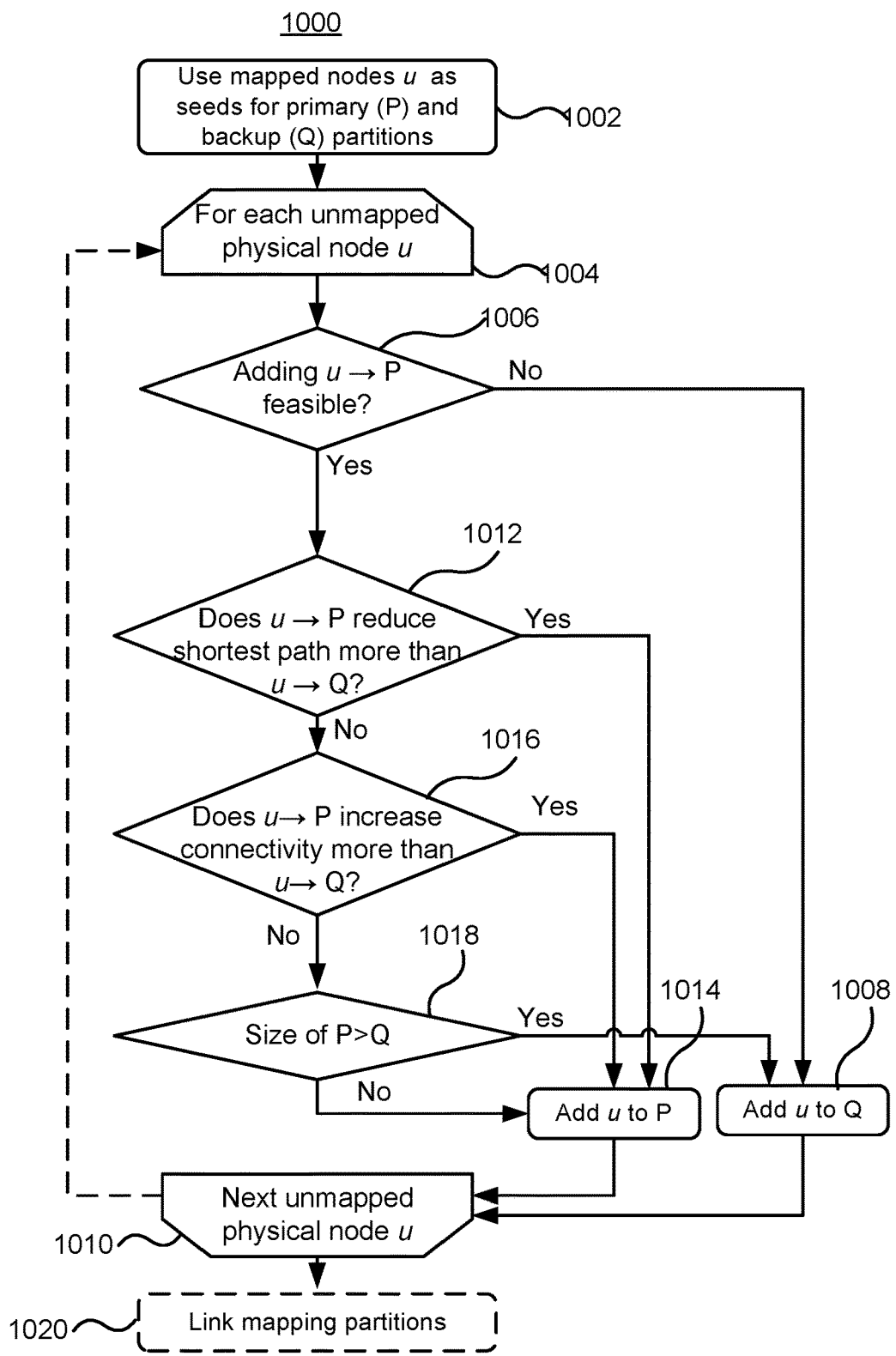
FIG. 10 depicts a method of physical network partitioning.

FIG. 10 depicts a method 1000 of physical network partitioning. The mapping of the virtual nodes provides a partial partitioning of the physical network. That is, the node mapping process maps a virtual node to a primary physical node and a backup physical node. Accordingly, all physical nodes used in a primary mapping may be considered as an initial primary partition $P_0$ of the physical network and the physical nodes used in the backup mapping of the virtual nodes may be considered as an initial backup partition $Q_0$. The partitioning phase attempts to assign all unmapped physical nodes to either a primary partition P or a backup partition Q.

The method 1000 begins at step 1002 by assigning the physical nodes used in primary mappings of virtual nodes as the initial seed for the primary partition P, and similarly assigning the physical nodes used in backup mappings of virtual nodes as the initial seed for the backup partition Q. The method then considers at a step 1004 each of the unmapped physical nodes to determine which of the two partitions the physical node should be added to. It is determined whether adding the current physical node to the primary partition P is feasible at a step 1006, and if it is not (No at step 1006) the physical node is added to the backup partition Q. Adding the physical node to P is not feasible if doing so would make it impossible for the nodes of Q to be connected. If adding the current physical node to P is feasible (Yes at step 1006), it is determined at a step 1012 whether adding the physical node to P reduces the shortest path in P more than the shortest path of Q would be reduced by adding the physical node to Q. If adding the physical node to P results in a greater reduction in a mean shortest path (Yes at step 1012), the physical node is added to P at a step 1014. If adding the physical node to P does not result in a greater reduction in the mean shortest path (No at step 1012), it is determined whether adding the physical node to P increases the connectivity of P more than it would increase the connectivity of Q by adding the physical node to Q (1016). If adding the physical node to P results in a greater increase of connectivity (Yes at 1016), the physical node is added to P (1014). Otherwise (No at 1016), the current sizes of the partitions P and Q are compared to determine if P is larger than Q at a step 1018. If P is larger than Q (Yes at step 1018), the physical node is added to Q at a step 1008. Otherwise (No at step 1020), the physical node is added to P at a step 1014 and the next unmapped physical node is considered at step 1010. If there are no more physical nodes to consider, the partitions are processed in order to map the virtual links in each partition at a step 1020.

Figure 11:
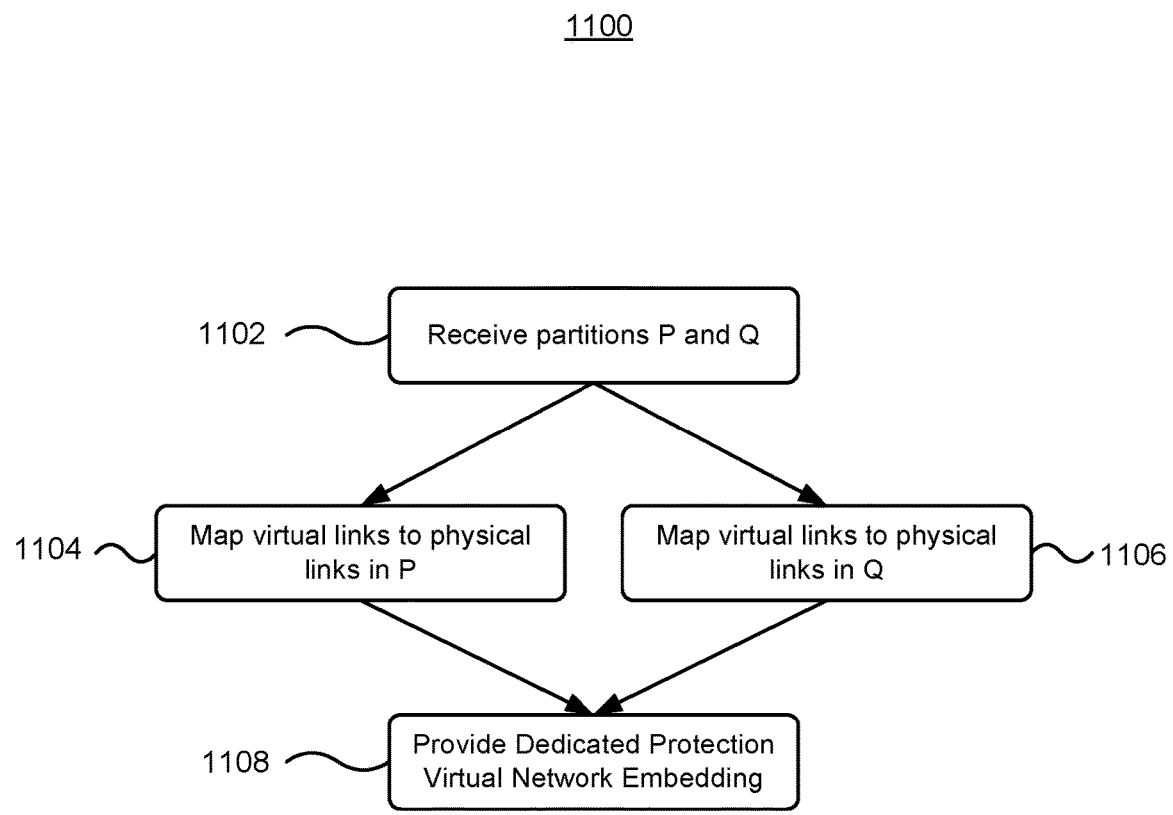
FIG. 11 depicts a method of node mapping.

FIG. 11 depicts a method 1100 of link mapping. The method 1100 receives the disjoint partitions P and Q at a step 1102. Since the two partitions are disjoint, the virtual link mappings for each partition can be considered independently from each other. Accordingly, the virtual links may be mapped to physical links, or paths of multiple physical links, in P at a step 1104, and similarly the virtual links may be mapped to physical links, or paths of multiple physical links, in Q at a step 1106. The link mapping of the two partitions may be done sequentially or in parallel. Mapping the virtual links may use a constrained shortest path first algorithm such as Dijkstra's algorithm or a variant of Dijkstra's algorithm. Once the virtual links have been mapped in both partitions, the virtual network embedding with dedicated protection may be provided in a step 1108, for example by embedding the mapping on the physical network, or for other purposes. For example, the determined embedding could be saved for use at a later time.

The above described heuristic approach to embedding a requested virtual network with dedicated protection may be implemented in a number of various ways. The following provides a pseudo code description of one possible implementation. Pseudo code listings for the node mapping function MapVNodes and for the graph partitioning function PartitionGraph are set forth below.

```
1:    function HeuristicVNE(G, Ḡ,location)
2:        {nmap_p,nmap_s} ← MapVNodes (G, Ḡ, location)
3:        {P, Q} ← PartitionGraph(G, nmap_p, nmap_s)
4:        emap_p ← EmbedAllVLinks(G, Ḡ, P, nmap_p)
5:        emap_s ← EmbedAllVLinks(G, Ḡ, Q, nmap_s)
6:        Compute embedding_cost from emap_p and emap_s
7:        return {nmap_p, emap_p, nmap_s, emap_s, cost}
8:    end function
```

The function HeuristicVNE receives a physical network description (G), a requested virtual network (Ḡ) and a set of location constraints (location) and returns a primary mapping of virtual nodes to physical nodes (nmap_p), a secondary or shadow mapping of virtual nodes to physical nodes (nmap_s), a primary mapping of virtual links to physical paths (emap_p), a secondary or shadow mapping of virtual links to physical paths (emap_s), and a cost for providing the mapping (cost). As depicted, the function HeuristicVNE maps the virtual nodes primary and secondary physical nodes by calling MapVNodes (line 2 of HeuristicVNE). The primary node mapping and secondary node mapping are then used to partition the physical network into to disjoint partitions by calling PartitionGraph (line 3 of HeuristicVNE). Once the physical network is partitioned into to disjoint partitions, the primary virtual links can be embedded on one partition (line 4 of HeuristicVNE) and the secondary virtual links can be embedded on the other partition (line 5 of HeuristicVNE). The cost of the embedding can then be computed (line 6 of HeuristicVNE) and the mappings and cost returned (line 7 of HeuristicVNE). Although the HeuristicVNE function described above includes the cost computation, it is possible to omit the cost calculation from the embedding process The embedding of the virtual links using nodes of the disjoint partitions of the physical network may be done using, for example a constrained shortest path first algorithm. The use of constrained shortest path first algorithms are understood by those of ordinary skill in the art and are not discussed in further detail herein. Similarly, computing the cost of embedding virtual links onto physical paths is understood by one of ordinary skill in the art.

```
01: function MapVNodes (G, Ḡ,location,seed)
02:     nmap_p (seed.node)←seed.primary
03:     nmap_s (seed.node)←seed.backup
04:     taken(seed.primary),taken(seed.backup)←false
05:     P←∅, Q←∅
06:     //Sequence V̄ represents virtual nodes sorted in
07:     //decreasing order of location constraint set size
```

```
08:     for all u̅ ∈ V̅ do
09:         best←NIL
10:         for all c ∈locations(u̅) do
11:             if taken(c)=false then
12:                 if BetterAssignment(G,P,Q,c,best)then
13:                     best←c
14:                 end if
15:             end if
16:         end for
17:         if best≠NIL then
18:             taken(best)←true
19:             nmap_p(u̅)←best, P←P ∪{best}
20:         end if
21:         best≠NIL
22:         for all c ∈locations(u̅) do
23:             if taken(c)=false then
24:                 if BetterAssignment(G, Q, P, c, best) then
25:                     best← c
26:                 end if
27:             end if
28:         end for
29:         if best≠NIL then
30:             taken(best)←true
31:             nmap_s(u̅)←best, Q←Q ∪ {best}
32:         end if
33:     end for
34:     return {nmap_p,nmap_s}
35: end function
```

As set forth in the pseudo code of the MapVNodes function above, an initial seed mapping of a virtual node to primary and secondary physical nodes and location constraint set are used to find a primary and backup node embedding for the other virtual nodes. The primary and secondary node mappings provide a partial partitioning of the physical network.

The node mapping functionality takes a greedy approach to map the virtual nodes to a primary physical node and a backup node, while satisfying the location constraints for the virtual node. The virtual nodes are mapped one at a time, with the virtual nodes picked in increasing order of their location constraint set size, although other orders are possible. The rationale for picking nodes in increasing constraint set size is that a virtual node with fewer possible locations for mapping is more constrained. Mapping a less constrained virtual node first might lead to infeasible mapping of the more constrained virtual node(s).

Node mapping is performed by the MapVNodes procedure in which a primary node mapping set $nmap_p$ and a secondary or shadow node mapping $nmap_s$ set are initialized with the provided seed mapping. The provided seed mapping may be randomly selected. Then one virtual node at a time is selected in order of increasing location constraint set size. The selected virtual node's constraint set is iterated over to find the best physical node for the primary mapping of the selected virtual node (Line 10-20). After finding a primary mapping for the virtual node, a secondary or shadow mapping for the virtual node is determined (Line 22-32). While considering a physical node u∈V as a primary mapping for a virtual node, the heuristic approach determines if the physical node u is a better choice compared to the currently best choice for the physical mapping. Whether or not a physical node u is a better choice than the current best physical node is evaluated using the BetterAssignment procedure. This procedure performs a number of hierarchical tests. The order the tests are applied is selected in order to minimize, or at least reduce, the chances of not finding a solution and to create a partition that yields a close to optimal embedding. The tests may include an infeasibility test, a compact mapping test and a connectivity contribution test.

The infeasibility test determines if adding u to the primary mapping makes the secondary mapping impossible to be connected and vice versa. If adding u to the primary mapping renders the secondary mapping impossible, then u must be added to the secondary mapping and as such no further tests need to be considered. Otherwise, the next test, which may be a compact mapping test, is considered.

The compact mapping test determines if adding u instead of the current best node mapping, best, to the primary, or secondary, mapping reduces the mean shortest path length among the nodes currently present in the primary, or secondary, mapping set. If the mean shortest path is reduced by adding u, then u is considered to be better than the best node and the best node is updated to u. If u does not reduce the mean shortest path length of the primary, or secondary, mapping, the next test may be considered.

The connectivity contribution test determines if u contributes more connectivity to the primary, or secondary, mapping set compared to the current best node. If it does, then the best node is updated to u. The connectivity contribution can be determined from criteria, including the reduction in connected components in the current mapping set if u is considered instead of the current best node in the mapping set as well as how many links are incident from u to the current mapping set compared to the links incident from the current best node.

The node mapping is performed for each virtual node to determine a best primary and secondary physical node mapping from the virtual nodes' location constraints. The mapping of individual virtual nodes continues until all of the virtual nodes have been mapped to both a primary physical node and a secondary physical node. The node mapping results in a primary node mapping set $nmap_p$ and a secondary node mapping set $nmap_s$. The primary and secondary mappings are used as the initial, or seed, partitions for partitioning the nodes of the physical network into primary and secondary partitions. The partitioning of the physical network may be done by the PartitionGraph functionality.

```
01: function PARTITIONGRAPH(G, nmap_p, nmap_s)
02:     P ← ∪_{∀n_p∈nmap_p} n_p , Q ← ∪_{∀n_s∈nmap_s} n_s
03:     taken←Array of size |V|, initialized with false
04:     for all u ∈ V do
05:         if taken(u)=false then
06:             if IsFeasiblePartition(G, P, Q, u) = false then
07:                 Q←Q ∪{ u }
08:             else
09:                 a. Add u to P (or Q) if u reduces shortest path in P (or
                       Q) more than in Q (or P)
10:                 b. Break a tie by adding u to P (or Q) if u reduces
                       more components in P (or Q)
11:                 c. In case of tie, assign u to P (or Q) if u has more
                       edges incident to P (or Q)
12:                 d. Break any remaining tie by assigning u to the
                       smaller of P and Q
13:             end if
14:         end if
15:     end for
16:     return {P, Q}
17: end function
```

Given a primary seed ($P_0$) and backup seed ($Q_0$) partitions obtained from the node mapping phase, the physical network G is partitioned into two disjoint partitions P and Q for the primary and backup embedding of the virtual network, respectively. Each physical node not already assigned to any of the partitions, or taken, (lines 4 and 5) are considered one at a time, and hierarchical tests are performed to determine which of the two partitions the physical node should be added to. The order the tests are applied in is chosen based on the same reasoning described above for the tests for determining the node mapping. The applied tests may include an infeasibility test, a compact partition test, a connectivity contribution test and a load balancing test.

The infeasibility test determines if u to partition P makes the partition Q impossible to be connected (lines 6) and if it does, then u is added to Q (line 7). The compact partition test determines if adding u to P reduces the shortest path length more than an amount that the shortest path length is reduced if u is added to Q (lines 9-11) If u reduces P more, it is added to P, otherwise the next test is considered. The connectivity contribution test determines whether a candidate node u∈V contributes more connectivity to P or to Q by evaluating if including u in P reduce a greater number of components compared to adding u to Q (lines 12-13). If including u in P reduces a greater number of components it is added to P, otherwise, it is determined if the candidate node u∈V has more physical links going to P compared to Q (line 14-16). If u has more physical links going to P, it is added to P, otherwise, u is added to the smaller set, that is the set with the fewest number of physical nodes, of P and Q.

The above has described a particular implementation of the heuristic approach. Although the heuristic approach may not find the optimal solution, the time required to find a solution that is close to an optimal solution is small even for large network sizes. The running time for the heuristic approach is $O((n'\sigma+n)(n+m+\delta+n'^3)+m'(n+m))$, where:

n is the number of nodes in the physical network;

n' is the number of nodes in the virtual network;

m is the number of edges, or links, in the physical network;

m' is the number of edges, or links, in the virtual network;

$\sigma$ is the maximum size of a location constraint set for any virtual node; and $\delta$ is a maximum degree of a physical node.

Performance of the ILP formulation approach and the heuristic approach was simulated. Simulations were performed using randomly generated network topologies with various connectivity levels. The ILP formulation was implemented using IBM ILOG CPLEX 12.5 C++ libraries. The heuristic approach was implemented in C++ as a multi-threaded application. Both the heuristic and ILP approaches were run on a computer system with hyper-threaded 8×10 core Intel Xeon E7-8870 CPU and 1 TB of memory. Both the ILP and heuristic approaches spawn up to 160 threads to saturate all of the processing cores during execution.

Random network topologies, generated by varying the number of nodes from 50 to 200 in increments of 25, and varying the link to node ratio (LNR) from 1.2 to 2.2 in increments of 0.1, were used to determine the effect of a physical network's connectivity on the performance of the heuristic approach. Three different virtual network topologies were generated, namely ring, star and randomly connected graphs with ≤15 virtual nodes in order to determine the effect of different virtual network types on the heuristic approach's performance.

Figure 12:
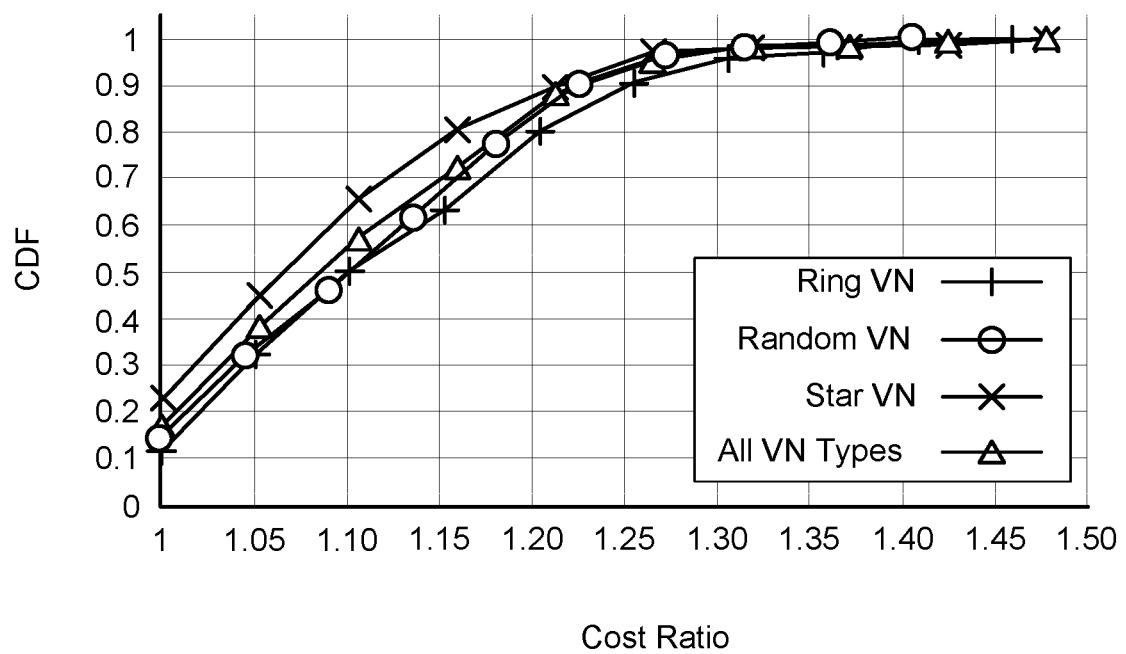
FIG. 12 depicts a cumulative distribution function (CDF) of cost ratios for different virtual network types.

FIG. 12 depicts the cumulative distribution function (CDF) of Cost Ratio for different virtual network (VN) types (ring VN, random VN, and star VN). An optimal solution, which used the ILP formulation as a tool, was compared to the heuristic approach based on how much extra resources the heuristic approach used in embedding the virtual network. The extra resource usage is measured as the ratio of the heuristic approach cost to the optimal solution cost since the cost function is directly proportional to the total bandwidth allocated for the virtual network. As depicted in FIG. 12, approximately 70% of virtual network requests were embedded by the heuristic approach using at most 15% extra resources, while 90% of virtual network requests were embedded by the heuristic approach using at most 23% extra resources. On average the heuristic approach provisioned virtual networks using 15% extra resources in comparison to the optimal solution determined using an ILP formulation approach.

Figure 13:
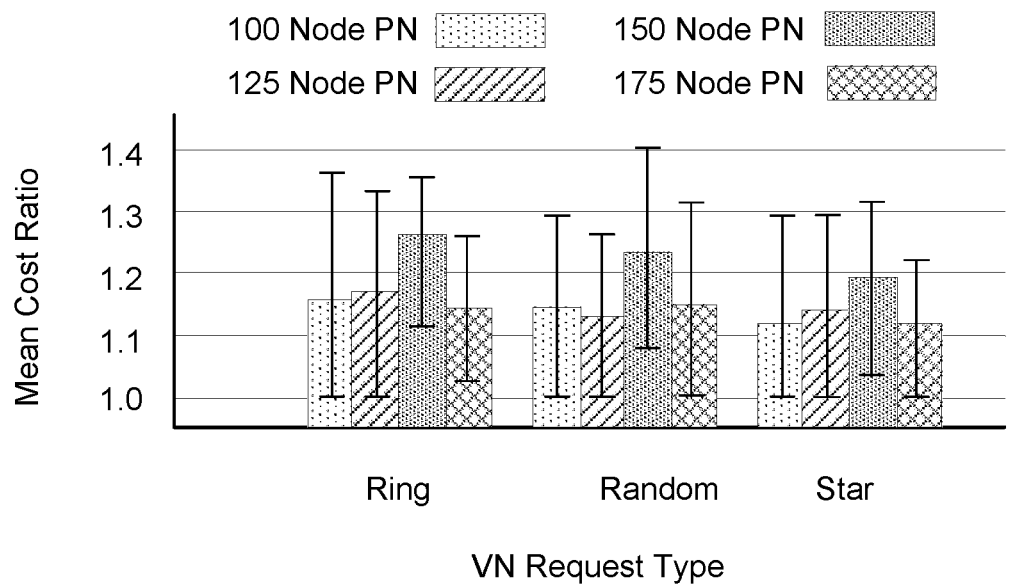
FIG. 13 depicts the cost ratio of different types of virtual network requests on different sizes of physical networks.

FIG. 13 depicts the cost ratio of different types of virtual network (VN) requests on different number of nodes of physical networks ("PN"). As seen in FIG. 13, the heuristic approach performs better for star and random virtual network types over ring virtual networks.

Figure 14:
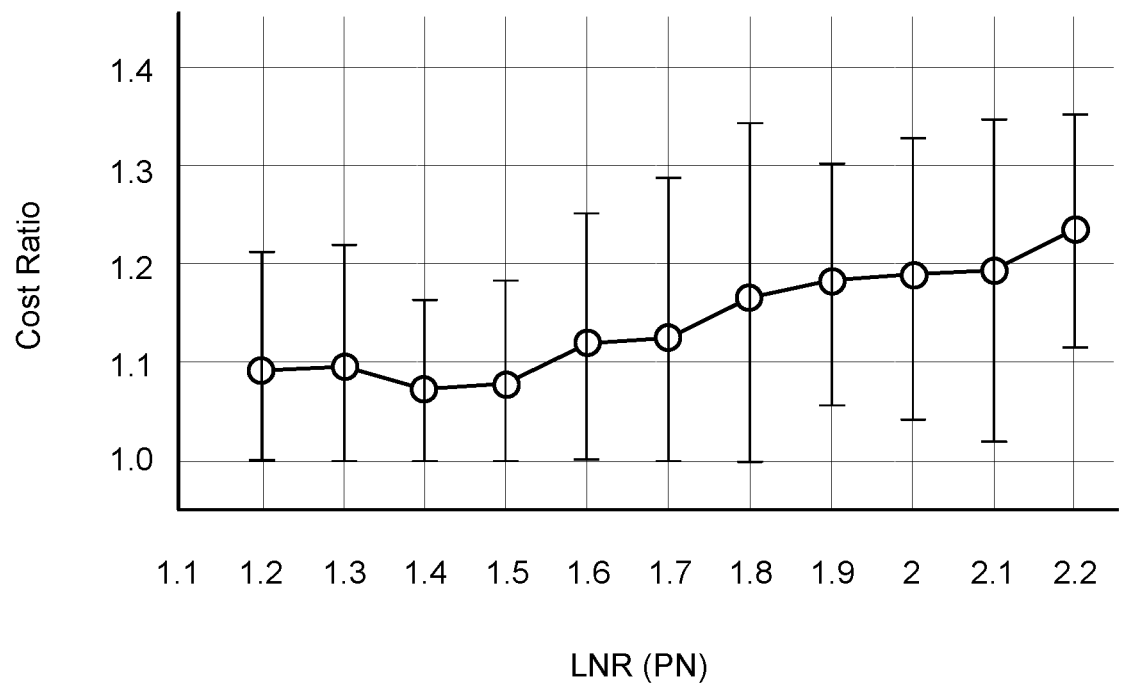
FIG. 14 depicts the mean cost ratio with 5th and 95th percentile error bars as a function of link-to-node ratios (LNRs)

FIG. 14 shows the mean cost ratio with 5th and 95th percentile error bars against different LNRs of the physical network (PN). The LNR of the synthetically generated physical networks was varied from 1.2 to 2.2 in increments of 0.1 and the mean cost ratio for each case was measured. From FIG. 14, it can be seen that the heuristic approach allocates about 15% extra resources compared to the optimal solution for physical networks having an LNR≤1.8. For higher LNR, the increased path diversity may lead to more suboptimal solution since the heuristic does not explore all paths to keep the execution time low.

Figure 15:
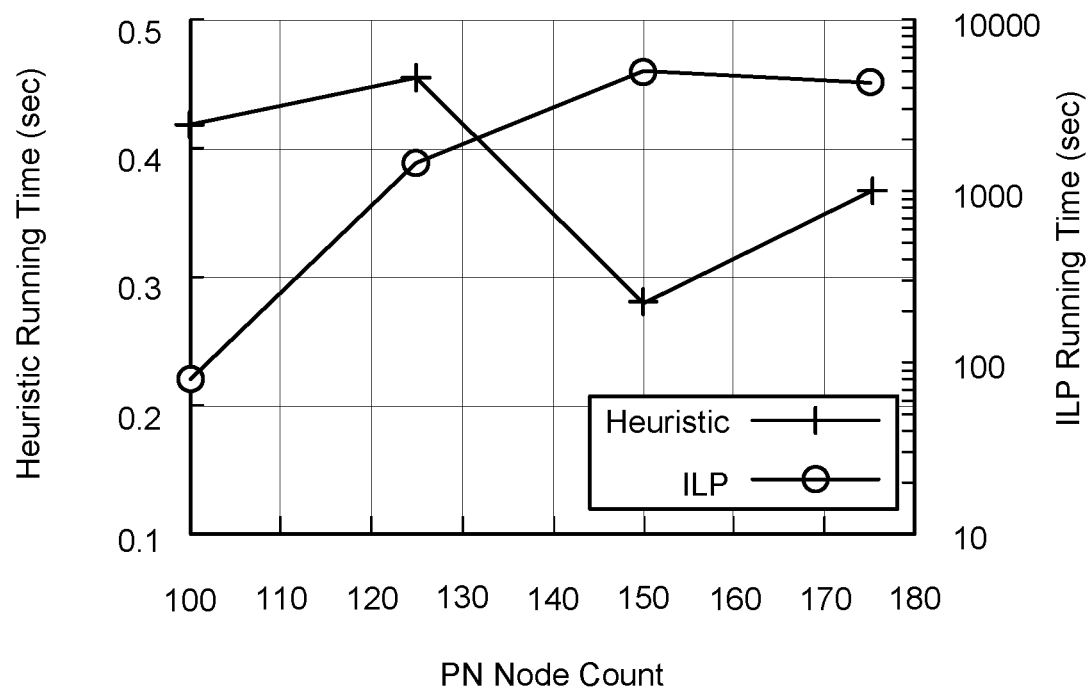
FIG. 15 depicts execution times of the heuristic approach and Integer Linear Programming (ILP) approach on the same virtual network embedding problem as a function of number of nodes in the physical network.

FIG. 15 plots the execution times of the heuristic approach and ILP approach on the same problem as a function of PN node count. As can be seen, the heuristic approach takes less than 500 ms on average over all test cases. In contrast, the ILP approach takes an average of 2 minutes to run on average on the smallest physical network instance of 100 nodes. The ILP approach becomes impractical as the physical network size increases. For example as the node count increases to 150 nodes, the ILP approach requires approximately 80 minutes to determine the solution.

The above has described various functionalities provided by various systems or components as required to provide efficient virtual network embeddings with dedicated protection for requested virtual networks. The functionality may be provided as a combination of hardware, firmware and software comprising instructions stored in a memory that are executed by a processor. It will be appreciated the processor and memory may be provided by a plurality of processors and memories communicatively coupled together as a distributed computing environment. The executed instructions configure systems and/or components to provide at least some of the functionality described herein. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A method for embedding a virtual network with dedicated protection onto a physical network comprising a plurality of physical nodes and a plurality of physical links connecting the physical nodes, the method comprising:

receiving a virtual network description of a virtual network topology for embedding onto the physical network, the virtual network description comprising:

a plurality of virtual nodes;

a plurality of virtual links connecting the virtual nodes; and a plurality of location constraints, each location constraint providing an indication of a physical node onto which a virtual node is not able to be provisioned; and embedding the virtual network with dedicated protection onto the physical network by:
 embedding the virtual network onto a first partition of physical nodes of the physical network, consistent with the location constraints; and
 embedding a shadow virtual network corresponding to the virtual network onto a second partition of physical nodes of the physical network, consistent with the location constraints, the physical nodes of the first and second partitions being selected such that the first and second partition have no physical nodes in common.

2. The method of claim 1, wherein the physical network is defined according to:

$$G=(V,E),$$

the virtual network is defined according to:

$$\overline{G}=(\overline{V},\overline{E})$$

the shadow virtual network is defined according to:

$$\tilde{G}=(\tilde{V},\tilde{E})$$

where:
 V is a set of individual physical nodes u;
 E is a set of individual physical links;
 $\overline{V}$ is a set of individual virtual nodes $\overline{u}$;
 $\overline{E}$ is a set of individual virtual links;
 $\tilde{V}$ is a set of individual shadow virtual nodes $\tilde{u}$ enumerated according to a transformation function $\tau(\overline{u})=\tilde{u}$; and
 $\tilde{E}$ is a set of individual shadow virtual links corresponding to the set of virtual links $\overline{E}$;

the method further comprising:
generating a protected virtual network description $\hat{G}=(\hat{V},\hat{E})$, where:

$$\hat{V}=\overline{V}\cup\tilde{V};$$

$$\hat{E}=\overline{E}\cup\tilde{E};$$

wherein embedding the virtual network with dedicated protection comprises:
 embedding $\hat{G}$ on the physical network such that:
  any virtual node $\overline{u}\in\overline{V}$ and any shadow virtual node $\tilde{u}\in\tilde{V}$ are not provisioned on a same physical node; and
  any virtual link $(\overline{u},\overline{v})\in\overline{E}$ and any shadow virtual link $(\tilde{u},\tilde{v})\in\tilde{E}$ are not provisioned on a same physical path comprising one or more of the physical links.

3. The method of claim 2, wherein the plurality of location constraints for a virtual node are provided by a location constraint set associated with the virtual node defined as:

$$l_{\overline{u}u} = \begin{cases} 1 & \text{if } \overline{u}\in\overline{V} \text{ can be provisioned on } u\in V, \\ 0 & \text{otherwise.} \end{cases}$$

4. The method of claim 3, wherein embedding the virtual network with dedicated protection is determined using an integer linear programming (ILP) formulation.

5. The method of claim 4, wherein the ILP formulation has an objective function of:

$$\text{minimize} \sum_{\forall(\hat{u},\hat{v})\in\hat{E}} \sum_{\forall(u,v)\in E} x_{uv}^{\hat{u}\hat{v}} \times C_{uv} \times b_{\hat{u}\hat{v}},$$

where:

$$x_{uv}^{\hat{u}\hat{v}} = \begin{cases} 1 & \text{if } (\hat{u},\hat{v})\in\hat{E} \text{ is mapped to } (u,v)\in E, \\ 0 & \text{otherwise,} \end{cases}$$

$C_{uv}$ is a cost of providing unit bandwidth for a physical link between physical nodes u, v; and $b_{\hat{u}\hat{v}}$ is a bandwidth requirement for a virtual link between virtual nodes $\hat{u},\hat{v}$.

6. The method of claim 3, wherein the embedding is determined using a heuristic approach comprising:
 a node mapping phase during which virtual nodes of the virtual network and shadow virtual nodes of the shadow virtual network are mapped to physical nodes of the physical network;
 a physical network partitioning phase during which unmapped physical nodes of the physical network are partitioned to either the first partition or the second partition; and
 a link mapping phase during which virtual links of the virtual network and shadow virtual links of the shadow virtual network are mapped to physical paths in respective ones of the first partition and second partition.

7. The method of claim 6, wherein the node mapping phase comprises mapping each node of the virtual network and each node of the shadow virtual network to a separate node of the physical network.

8. The method of claim 7, wherein the node mapping phase further comprises one or more of:
 determining whether mapping a virtual node to a physical node makes it impossible to connect remaining virtual nodes;
 determining whether mapping a virtual node to a physical node reduces a shortest path length of virtual nodes in the first partition or the second partition; and
 determining whether mapping a virtual node to a physical node increases a connectivity of virtual nodes in the first partition or the second partition.

9. The method of claim 8, wherein the physical network partitioning phase comprises one or more of:
 determining whether adding the unmapped physical node to one of the first or second partitions makes virtual nodes of the other partition impossible to be connected;
 determining whether adding the unmapped physical node to one of the first or second partitions reduces a shortest path length in the first or second partitions;
 determining whether adding the unmapped physical node to one of the first or second partitions increases a connectivity of virtual nodes in the first partition or the second partition; and
 determining which one of the first and second partitions is smaller.

10. The method of claim 9, wherein the link mapping phase comprises mapping virtual links to physical paths within the disjoint partitions.

11. A system for embedding a virtual network with dedicated protection onto a physical network comprising a plurality of physical nodes and a plurality of physical links connecting the physical nodes, the system comprising:
 a processing unit for executing instructions; and
 a memory unit for storing instructions, which when executed by the processor configure the system to perform steps for:

receiving a virtual network description of a virtual network topology for embedding onto the physical network, the virtual network description comprising:
   a plurality of virtual nodes;
   a plurality of virtual links connecting the virtual nodes; and
   a plurality of location constraints, each location constraint providing an indication of a physical node a virtual node is able to be provisioned on; and
embedding the virtual network with dedicated protection onto the physical network by:
   embedding the virtual network onto a first partition of physical nodes of the physical network, consistent with the location constraints; and
   embedding a shadow virtual network corresponding to the virtual network onto a second partition of physical nodes of the physical network, consistent with the location constraints, the nodes of the first and second partitions being selected such that the first and second partition have no physical nodes in common, disjoint from the first partition of the physical.

12. The system of claim 11, wherein the physical network is defined according to:

$$G=(V,E)$$

the virtual network is defined according to:

$$\overline{G}=(\overline{V},\overline{E}),$$

the shadow virtual network is defined according to:

$$\tilde{G}=(\tilde{V},\tilde{E})$$

where:
   V is a set of individual physical nodes u;
   E is set of individual physical links;
   $\overline{V}$ is a set of individual virtual nodes $\overline{u}$;
   $\overline{E}$ is a set of individual virtual links;
   $\tilde{V}$ is a set of individual shadow virtual nodes $\tilde{u}$ enumerated according to a transformation function $\tau(\overline{u})=\tilde{u}$; and
   $\tilde{E}$ is a set of individual shadow virtual links corresponding to the set of virtual links $\overline{E}$;
wherein when executed by the processor the instructions further configure the system to perform steps for:
   generating a protected virtual network description $\hat{G}=(\hat{V},\hat{E})$, where:

$$\hat{V}=\overline{V}\cup\tilde{V},$$

$$\hat{E}=\overline{E}\cup\tilde{E},$$

wherein embedding the virtual network with dedicated protection comprises:
   embedding $\hat{G}$ on the physical network such that:
     any virtual node $\overline{u}\in\overline{V}$ and any shadow virtual node $\tilde{u}\in\tilde{V}$ are not provisioned on a same physical node; and
     any virtual link $(\overline{u},\overline{v})\in\overline{E}$ and any shadow virtual link $(\tilde{u},\tilde{v})\in\tilde{E}$ are not provisioned on a same physical path comprising one or more of the physical links.

13. The system of claim 12, wherein the plurality of location constraints for a virtual node are provided by a location constraint set associated with the virtual node defined as:

$$l_{\overline{u}u}=\begin{cases}1 & \text{if } \overline{u}\in\overline{V} \text{ can be provisioned on } u\in V,\\ 0 & \text{otherwise.}\end{cases}$$

14. The system of claim 13, wherein embedding the virtual network with dedicated protection is determined using an integer linear programming (ILP) formulation.

15. The system of claim 14, wherein the ILP formulation has an objective function of:

$$\text{minimize}\left(\sum_{\forall(\hat{u},\hat{v})\in\hat{E}}\sum_{\forall(u,v)\in E}x_{uv}^{\hat{u}\hat{v}}\times C_{uv}\times b_{\hat{u}\hat{v}}\right)$$

where:

$$x_{uv}^{\hat{u}\hat{v}}=\begin{cases}1 & \text{if } (\hat{u},\hat{v})\in\hat{E} \text{ is mapped to } (u,v)\in E,\\ 0 & \text{otherwise}\end{cases}$$

$C_{uv}$ is a cost of providing unit bandwidth for a physical link between physical nodes u,v; and
$b_{\hat{u}\hat{v}}$ is a bandwidth requirement for a virtual link between virtual nodes $\hat{u},\hat{v}$.

16. The system of claim 13, wherein the embedding is determined using a heuristic approach comprising:
   a node mapping phase during which virtual nodes of the virtual network and shadow virtual nodes of the shadow virtual network are mapped to physical nodes of the physical network;
   a physical network partitioning phase during which unmapped physical nodes of the physical network are partitioned to either the first partition or the second partition; and
   a link mapping phase during which virtual links of the virtual network and shadow virtual links of the shadow virtual network are mapped to physical paths in respective ones of the first partition and second partition.

17. The system of claim 16, wherein the node mapping phase comprises mapping each virtual node of the virtual network and each shadow virtual node of the shadow virtual network to a separate physical node of the physical network.

18. The system of claim 17, wherein the node mapping phase further comprises one or more of:
   determining whether mapping a virtual node to a physical node makes it impossible to connect remaining virtual nodes;
   determining whether mapping a virtual node to a physical node reduces a shortest path length of virtual nodes in the first partition or the second partition; and
   determining whether mapping a virtual node to a physical node increases a connectivity of virtual nodes in the first partition or the second partition.

19. The system of claim 18, wherein the physical network partitioning phase comprises one or more of:
   determining whether adding the unmapped physical node to one of the first or second partitions makes virtual nodes of the other partition impossible to be connected;
   determining whether adding the unmapped physical node to one of the first or second partitions reduces a shortest path length in the first or second partitions;
   determining whether adding the unmapped physical node to one of the first or second partitions increases a connectivity of virtual nodes in the first partition of the second partition; and
   determining which one of the first and second partitions is smaller.

20. The system of claim 19, wherein the link mapping phase comprises mapping virtual links to physical paths within the disjoint partitions.

* * * * *

UNITED STATES PATENT AND TRADEMARK OFFICE
CERTIFICATE OF CORRECTION

PATENT NO. : 10,313,195 B2
APPLICATION NO. : 15/048411
DATED : June 4, 2019
INVENTOR(S) : Reaz Ahmed et al.

It is certified that error appears in the above-identified patent and that said Letters Patent is hereby corrected as shown below:

In the Claims

Claim 2:
Column 21, Line 24:
"$\bar{G} = (\bar{V}, \bar{P})$"
Should read:
--$\bar{G} = (\bar{V}, \bar{E})$--

Claim 12:
Column 23, Lines 41-43:
"$\bar{V}$ is a set of individual shadow virtual nodes ũ enumerated according to a transformation function τ(ū)=ũ; and"
Should read:
--$\bar{V}$ is a set of individual shadow virtual nodes ũ enumerated according to a transformation function $\tau(\bar{u}) = \tilde{u}$; and--

Signed and Sealed this
Second Day of June, 2020

Andrei Iancu
*Director of the United States Patent and Trademark Office*